(12) United States Patent
Vijay et al.

(10) Patent No.: US 9,821,337 B2
(45) Date of Patent: Nov. 21, 2017

(54) INTEGRATED FLUIDJET SYSTEM FOR STRIPPING, PREPPING AND COATING A PART

(71) Applicant: VLN Advanced Technologies Inc., Ottawa, Ontario (CA)

(72) Inventors: Mohan M. Vijay, Ottawa (CA); Meisheng M. Xu, Ottawa (CA); Emilio Panarella, Ottawa (CA); Wenzhuo Yan, Ottawa (CA); Andrew Hung Tieu, Ottawa (CA); Bruce R. Daniels, Ottawa (CA)

(73) Assignee: VLN Advanced Technologies Inc., Ottawa (CA)

(*) Notice: Subject to any disclaimer, the term of this patent is extended or adjusted under 35 U.S.C. 154(b) by 0 days.

(21) Appl. No.: 15/297,265

(22) Filed: Oct. 19, 2016

(65) Prior Publication Data

US 2017/0036239 A1 Feb. 9, 2017

Related U.S. Application Data

(63) Continuation of application No. 14/537,436, filed on Nov. 10, 2014, now Pat. No. 9,512,531.

(Continued)

(51) Int. Cl.
*B05B 5/08* (2006.01)
*B05B 5/10* (2006.01)
(Continued)

(52) U.S. Cl.
CPC .................. *B05D 1/12* (2013.01); *B05B 1/08* (2013.01); *B05B 5/001* (2013.01); *B05B 5/006* (2013.01);

(Continued)

(58) Field of Classification Search
None
See application file for complete search history.

(56) References Cited

U.S. PATENT DOCUMENTS 3,801,869 A * 4/1974 Masuda ................. B05B 5/088
361/227
4,020,393 A * 4/1977 Porter ....................... B05B 5/10
239/707

(Continued)

FOREIGN PATENT DOCUMENTS

GB 1103190 A 2/1968

OTHER PUBLICATIONS

Heimann et al., "Recently Patented Work on Thermally Sprayed Coatings for Protection Against Wear and Corrosion of Engineered Structures", Recent Patents on Materials Science 2008, 1, 41-55.

(Continued)

*Primary Examiner* — Binu Thomas
(74) *Attorney, Agent, or Firm* — O'Shea Getz P.C.

(57) ABSTRACT

An integrated liquidjet system capable of stripping, prepping and coating a part includes a cell defining an enclosure, a jig for holding the part inside the cell, an ultrasonic nozzle having an ultrasonic transducer for generating a pulsed liquidjet, a coating particle source for supplying coating particles to the nozzle, a pressurized liquid source for supplying the nozzle with a pressurized liquid to enable the nozzle to generate the pulsed liquidjet to sequentially strip, prep and coat the part, a high-voltage electrode and a ground electrode inside the nozzle for charging the coating particles, and a human-machine interface external to the cell for receiving user commands and for controlling the pulsed liquidjet exiting from the nozzle in response to the user commands.

12 Claims, 22 Drawing Sheets

Related U.S. Application Data

(60) Provisional application No. 61/901,676, filed on Nov. 8, 2013.

(51) Int. Cl.

| | | |
|---|---|---|
| *B05B 5/03* | (2006.01) | |
| *B05B 5/053* | (2006.01) | |
| *B05B 17/06* | (2006.01) | |
| *B05C 19/00* | (2006.01) | |
| *B05C 15/00* | (2006.01) | |
| *B05D 1/12* | (2006.01) | |
| *C25D 5/00* | (2006.01) | |
| *C25D 21/12* | (2006.01) | |
| *C25D 5/34* | (2006.01) | |
| *C25D 5/50* | (2006.01) | |
| *C25D 15/00* | (2006.01) | |
| *C25D 5/08* | (2006.01) | |
| *B05B 15/12* | (2006.01) | |
| *B05B 5/00* | (2006.01) | |
| *B24C 3/12* | (2006.01) | |
| *B05B 1/08* | (2006.01) | |
| *B05B 5/035* | (2006.01) | |
| *B05B 13/04* | (2006.01) | |
| *B08B 3/02* | (2006.01) | |
| *B25J 11/00* | (2006.01) | |
| *B25J 21/00* | (2006.01) | |
| *C23C 24/04* | (2006.01) | |
| *B24C 5/00* | (2006.01) | |
| *B05B 5/16* | (2006.01) | |
| *B05B 12/08* | (2006.01) | |
| *B05D 3/12* | (2006.01) | |
| *B24C 7/00* | (2006.01) | |
| *C23C 18/18* | (2006.01) | |

(52) U.S. Cl.
CPC .............. *B05B 5/032* (2013.01); *B05B 5/035* (2013.01); *B05B 5/08* (2013.01); *B05B 5/082* (2013.01); *B05B 5/10* (2013.01); *B05B 5/16* (2013.01); *B05B 12/08* (2013.01); *B05B 13/0431* (2013.01); *B05B 15/1214* (2013.01); *B05B 17/06* (2013.01); *B05B 17/0607* (2013.01); *B05B 17/0653* (2013.01); *B05C 15/00* (2013.01); *B05C 19/00* (2013.01); *B05D 3/12* (2013.01); *B08B 3/024* (2013.01); *B24C 3/12* (2013.01); *B24C 5/005* (2013.01); *B25J 11/0075* (2013.01); *B25J 21/00* (2013.01); *C23C 24/04* (2013.01); *C25D 5/006* (2013.01); *C25D 5/08* (2013.01); *C25D 5/34* (2013.01); *C25D 5/50* (2013.01); *C25D 15/00* (2013.01); *C25D 21/12* (2013.01); *B05B 15/12* (2013.01); *B05B 15/1207* (2013.01); *B05B 15/1225* (2013.01); *B08B 2203/0288* (2013.01); *B24C 7/00* (2013.01); *C23C 18/1806* (2013.01)

(56) References Cited

U.S. PATENT DOCUMENTS

| | | | |
|---|---|---|---|
| 4,334,780 | A | 6/1982 | Pernick |
| 5,154,347 | A | 10/1992 | Vijay |
| 5,436,645 | A | 7/1995 | Uemura et al. |
| 5,585,921 | A | 12/1996 | Pepper et al. |
| 5,612,096 | A | 3/1997 | Mulder et al. |
| 6,276,617 | B1 | 8/2001 | Lenhardt |
| 7,184,138 | B1 | 2/2007 | Li |
| 7,594,614 | B2 | 9/2009 | Vijay et al. |
| 7,594,641 | B2 | 9/2009 | Sharp |
| 8,297,540 | B1 | 10/2012 | Vijay |
| 8,389,066 | B2 | 3/2013 | Vijay |
| 8,550,873 | B2 | 10/2013 | Vijay et al. |
| 8,691,014 | B2 | 4/2014 | Vijay |
| 2002/0098776 | A1 | 7/2002 | Dopper |
| 2002/0153117 | A1* | 10/2002 | Allor ............... B22D 23/003 164/46 |
| 2007/0160769 | A1 | 7/2007 | Maev et al. |
| 2011/0250361 | A1* | 10/2011 | Vijay ............... B05B 7/205 451/38 |

OTHER PUBLICATIONS

Jen et al., "The Acceleration of Charged Nano-Particles in Gas Stream of Supersonic de-Laval-Type Nozzle Coupled with Static Electric Field," Applied Thermal Engineering 26 (2006) 613-621.

* cited by examiner

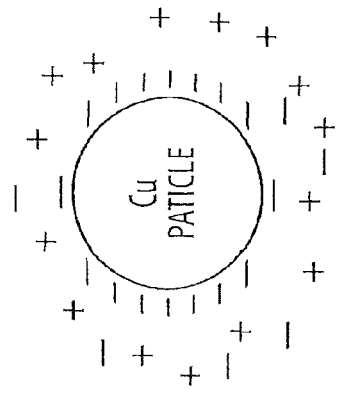
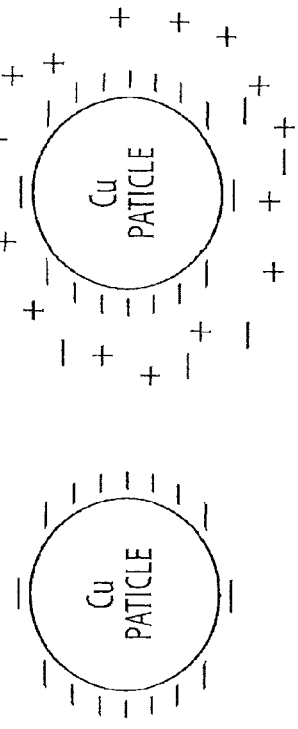
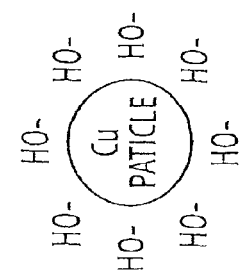
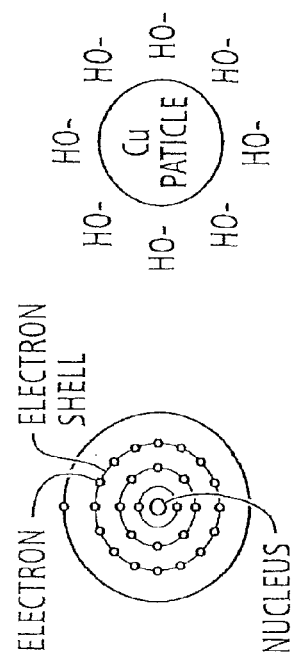
FIG. 9A  FIG. 9B  FIG. 9C  FIG. 9D
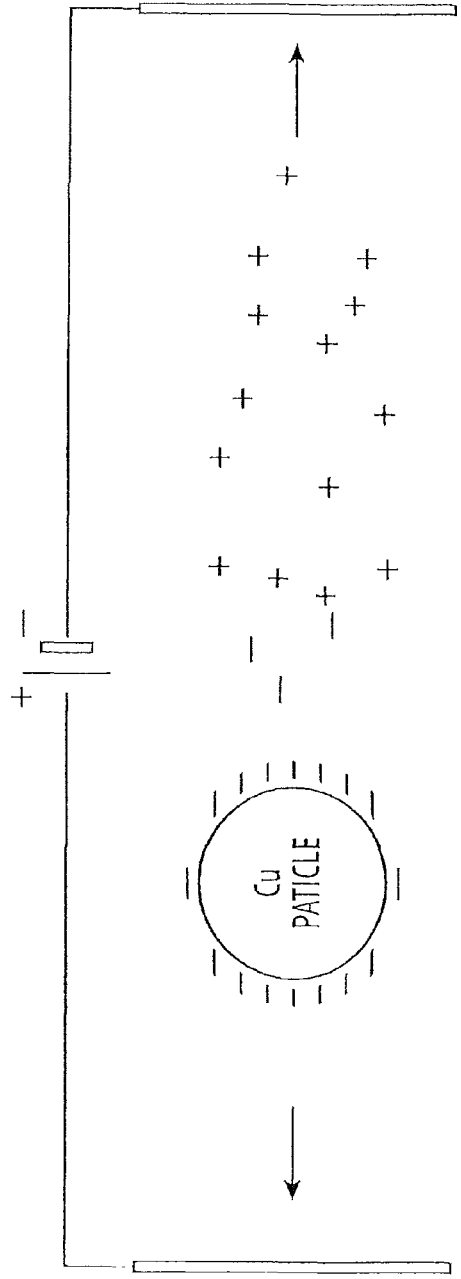
FIG. 9E

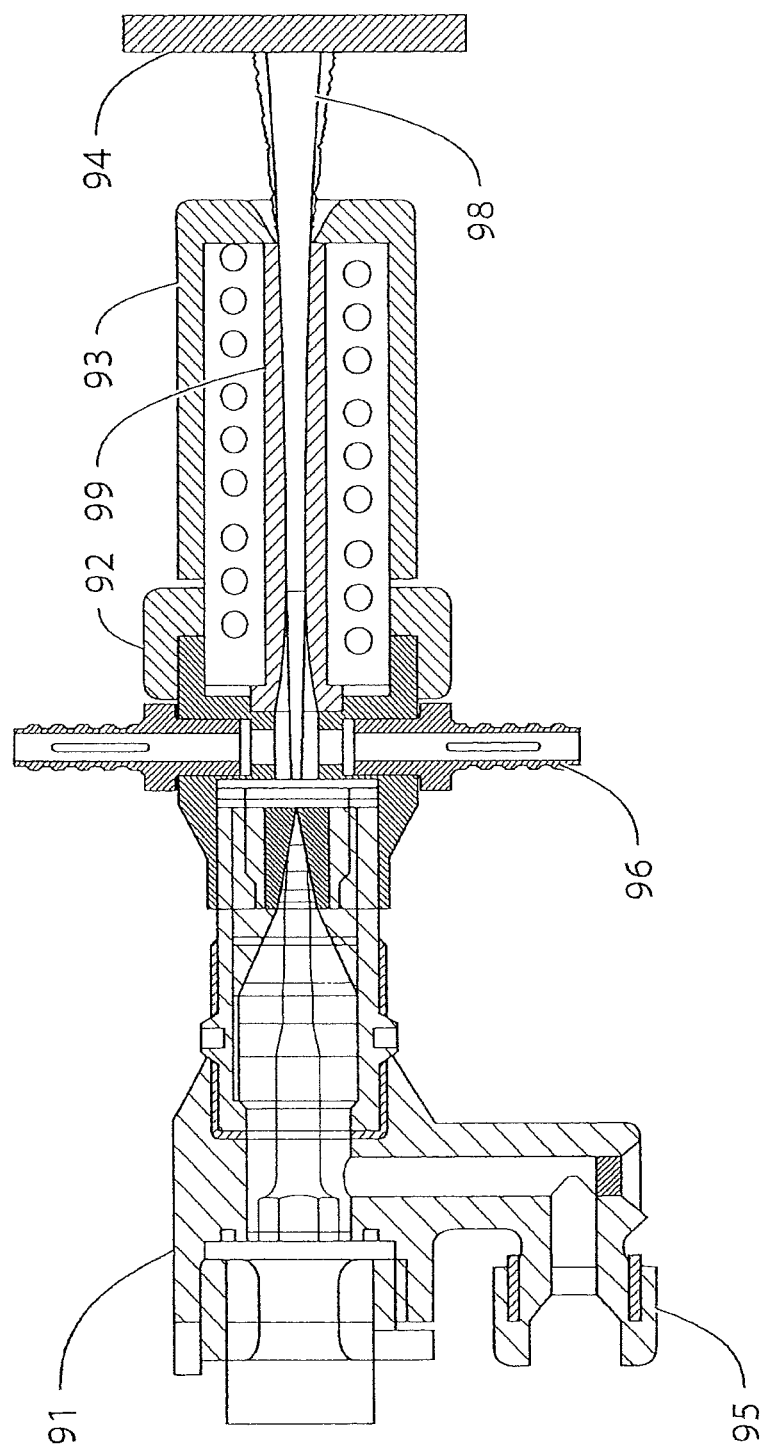

INTEGRATED FLUIDJET SYSTEM FOR STRIPPING, PREPPING AND COATING A PART

CROSS-REFERENCE TO RELATED APPLICATION

The present application is a continuation of U.S. patent application Ser. No. 14/537,436 which claims priority from U.S. Provisional Patent Application 61/901,676 entitled "INTEGRATED FLUIDJET SYSTEM FOR STRIPPING, PREPPING AND COATING A PART" filed Nov. 8, 2013, which is hereby incorporated by reference.

TECHNICAL FIELD

The present invention relates generally to fluidjets and, in particular, to techniques for stripping, prepping and coating a part using a pulsed or continuous fluidjet.

BACKGROUND

Conventionally, coating a part is a two-stage or three-stage process, depending on whether the part to be coated is new or was already in service. If the part is new, in the first stage, the surface to be coated is prepped using grit blasting. In the second stage, following prepping, the coating is applied to the surface. If the part was already in service, then the three-stage process consists of stripping the existing coating, followed by prepping, then applying the new coating. Many different coating and plating technologies are known. What follows is an overview of some of the main technologies currently in use today.

Chrome Plating

Chrome plate has been the mainstay for applications with intense stress, such as the landing gear on aircraft. Other applications include extreme wear conditions, like the hydraulic shafts on heavy earth moving vehicles. It offers the following properties:

(i) Hardness: At 65 to 70-Rc (850-1000-Hv), hard chrome plate is harder than most industrial abrasives. Combined with inherent toughness, it can withstand high stress contact.

(ii) Substrate adhesion: With adhesion greater than 10-kpsi, hard chrome coatings can endure large stresses without detaching from the substrate.

(iii) Chrome can be applied on a wide variety of substrates.

(iv) Chrome responsive finish: responds well to grinding and polishing.

(v) Chrome may be applied to substrates having different geometries: because it is applied via plating, chrome can provide a high-quality coating on most complex geometries, unlike several of the alternative technologies.

(vi) Corrosion resistant: the coating is stable in the presence of many corrosive substances (organic acids, etc).

(vii) Wear resistant in metal-on-metal sliding: Chrome plate coatings are nearly 100 times as resistant to wear in situations with two dry metal surfaces sliding against each other, compared to nitrided steels.

(viii) Abrasion resistant: Even under high contact stresses, chrome plate exhibits a low wear rate against abrasive materials (>100 times than hardened steel).

(ix) Produces a low friction surface: Offers a smooth low friction surface.

(x) Compatible with lubricants: Cracked chrome, with small cracks in the surface, holds lubricants enhancing wear life and lubricity in demanding applications.

The electrocoating itself is performed by charging a low-voltage direct current through the bath. The part to be plated is usually the cathode, and the anode is typically a bar of lead-antimony or lead-tin alloy.

For hard chromium plating, the plating solution contains ions of hexavalent chromium from chromic acid, as well as sulfuric acid to improve the bath's conductivity. As the electricity is supplied to the solution, electrolytic decomposition of the water in the bath releases hydrogen gas at the cathode and oxygen at the anode. The result of the plating process is the deposition of metallic chromium on the substrate. Typical process parameters for hard chrome plating are: chromic acid: 250-g/liter (or 400 for concentrated), sulfuric acid: 2.5-g/liter (or 4), temperature: 55° C. (or 50°) and deposition rate: 25-Φm/hr (or 13).

Toxic emissions from chrome plating arise from the plating step itself and from the chromic acid anodizing step. In the plating step, mists of the electrolyte (mostly chromic acid) are generated by the rise of hydrogen and oxygen bubbles through the bath. The emission rates are affected by the bath temperature, concentration of chemicals in the bath, the surface area undergoing plating, and the plating current. As hard coating consumes higher current, it generates more chromic acid mist. The emissions are controlled by using hoods and more recently by employing scrubbers, electrostatic precipitators and activated carbon filters.

Hexavalent chromium ($CrO_3$) has long been known to be dangerous for workers at chrome plating facilities, causing many health problems (irritated nasal septum, dermatitis, etc). Another difficulty with chrome plating is elemental chrome dust resulting from grinding, which has been shown to be carcinogenic. Consequently, OSHA (Occupational Safety and Health Administration) has proposed to lower the permissible exposure limit (PEL) for workers from 52-Φg/$m^3$ to 1-Φg/$m^3$ as an 8-hr time weighted average, which will significantly increase the cost of chrome plating (may apply to nickel plating also).

There are a number of disadvantages of chrome plating.

First, toxic emissions in the chrome plating, which arise from the plating step itself, and from the chromic acid anodizing step. In the plating step, mists of the electrolyte (mostly chromic acid) are generated by the rise of hydrogen and oxygen bubbles through the bath. The emission rates are affected by the bath temperature, concentration of chemicals in the bath, the surface area undergoing plating, and the plating current. As hard coating consumes higher current, it generates more chromic acid mist. The emissions are controlled by using hoods and more recently by employing scrubbers, electrostatic precipitators and activated carbon filters.

Second, hexavalent chromium ($CrO_3$) has long been known to be dangerous for workers at chrome plating facilities, causing many health problems (irritated nasal septum, dermatitis, etc). Another difficulty with chrome plating is elemental chrome dust resulting from grinding, which has been shown to be carcinogenic. Consequently, OSHA (Occupational Safety and Health Administration) has proposed to lower the permissible exposure limit (PEL) for workers from 52-Φg/$m^3$ to 1-Φg/$m^3$ as an 8-hr time weighted average, which will significantly increase the cost of chrome plating (which may apply to nickel plating also).

Third, chrome plate offers properties that are generally good, but hardly ever excellent. The material offers limited hardness and corrosion resistance. It suffers from pitting, spalling and other failures under stressful conditions. Users became generally aware that for specific applications, there may be substitutes that perform better than chrome plate at a comparable or even lower cost. For a number of specific applications, alternative technologies have already proven their value. In the long run, chrome dominance in many applications has diminished.

Fourth, hard chrome has a high intrinsic stress leading to a significant fatigue drawback. Fatigue issues in aircraft are serious concerns for structural components and critical hydraulics. Consequently, such parts are routinely treated with shot peening to eliminate stress.

Fifth, chrome plating also causes hydrogen embrittlement in high strength steel substrates used in landing gears, etc. For this reason, these parts must be heat treated after plating, adding to the overall cost and processing time. It also suffers pitting in humid and corrosive environments. Masking also is difficult in chrome plating.

Sixth, hard chrome's intrinsic brittleness leads to microcracking, which are unsuitable when corrosion resistance is needed, requiring nickel underlayers. Also, the rate of deposition is slow (4 to 8-microns/hr compared to 30-microns for nickel plating). Also, the coating process lacks uniformity, requiring follow-up machining to dimensional tolerances.

Seventh, aircraft parts that are chrome plated are exposed to severe wear and corrosion stresses during service. Because these parts also tend to be expensive, they demand several refurbishments during their lives. Chrome plating is also used to restore dimensional tolerances of parts which were not originally chrome plated. Chrome plating is used both in commercial and military aircrafts, which are done in several ways.

Hydraulic actuators and landing gears are important applications of chrome plate in aircraft. These are complex and expensive and are generally made from high strength steels. Several actuators are used to raise, lower and manipulate the landing gear. Most aircraft will have anywhere from 25 to 100 actuators.

Landing gears are large components that see service for brief periods of time but must bear enormous stress on landing and, occasionally, takeoff. A landing gear inner cylinder can be three to eight feet in length and two to six feet in diameter. The inner cylinder is often a single machined part that includes the piston and wheel bearing journals. The piston is plated over most of its length, and the journals are plated in the bearing journal areas. The chrome plate is typically 0.003-in thick. All landing gears are chrome plated for resistance to wear and corrosion. Aircraft must have at least three landing gears, while some of the larger airlines (e.g. Boeing 747) may have four or five.

Alternatives to Chrome Plating

Trivalent Chromium is much less hazardous than hexavalent chromium but will also allow electroplating. Process improvements and technological advances have changed trivalent chromium from inferior substitute to a serious contender with properties that rival those of hexavalent. It also allows 100% recycling. However, it remains expensive, and is less tolerant to impurities. It is profusely used in the auto industry (where there is much less of a regulatory burden). In terms of environmental protection, regulations are the same as hexavalent.

Thermal Spray

Thermal spray refers to at least 14 different types of coating processes that use thermal and kinetic energy to accelerate particles from powder or wire onto a substrate. The forms of thermal spray differ widely in how they use that thermal and kinetic energy, which in turn produces significant variation in the coatings supplied.

The various types of thermal spray are organized under the following families: flame spray, plasma spray, and electric arc. Each thermal spray technique involves basically the same process. First, raw material is fed into a heat source, i.e., thermal spray gun, where it is melted and then blown onto the substrate in the form of molten droplets. The droplets impact the surface of the substrate where they deform around the features in the roughened surface and solidify in a disk shape.

Thermal spray offers a number of advantages over competing coating methods. While some thermal spray technologies are limited in their choice of raw materials, a virtually unlimited range of materials can be accommodated by at least one method. Thermal spray allows a fast deposition rate, ability to deposit on highly heat sensitive surfaces, use of portable equipment and is often quite economical. Coatings are mechanically bonded to the surface, making chemical compatibility less of an issue compared with other coating methods. Thermal spray can be used to deposit coatings of plastics, metals, carbides, and ceramic coatings as thick as 0.25-in (6.35 mm). An added benefit is that no wet chemicals are used in the process, thus minimizing any environmental impact. While water is used to cool thermal spray equipment during operation, it never comes into contact with potentially hazardous materials and so no treatment is necessary. Overspray material can be captured and recycled.

Plasma Spray

Rather than burning a fuel gas, plasma spray ionizes a gas such as nitrogen at very high temperatures to produce a plasma which melts powder particles and sprays a dense coating at a somewhat limited velocity. It uses the highest temperature heat source; the core of the plasma can reach temperatures as high as 16,000° C. Along with the high thermal energy, it produces high gas velocities, up to Mach 2. The high temperatures used in plasma spray enable the method to work with materials with very high melting points, like some ceramics, with good properties. The high particle velocity allows densities in the coatings of up to 98 percent. It uses relatively large powder particles, usually in excess of 45-Φ in diameter, although diameters as low as 15-Φ have been used. Because of lower particle velocities at high temperatures, bond strengths are lower and porosity higher compared to HVOF (High-Velocity-Oxygen-Fuel). It offers limited corrosion protection, especially compared to HVOF. Plasma coatings suffer from interconnecting porosity even at thicknesses of 30-Φ, which exposes the bare metal. It has proven itself an inexpensive method for building up a surface, adding metal on spots where the surface has been worn or damaged. It is extensively used for forming thermal spray barriers.

D-Gun

The D-Gun (developed by Praxair) process involves bringing gas, fuel (usually acetylene) and powder into a chamber, igniting the mixture and emitting it from a barrel. The process works by intermittent combustion, pulsing the ignition six times per second, unlike HVOF which is continuous and less expensive. There are a range of proprietary coatings available with D-gun, some of which may result in denser coatings than HVOF or more varying metallographic structures. It is more costly to run than conventional HVOF, because of the complexity and control requirements for pulsing the ignition. The motion of the part to be coated also has to be coordinated with the timing of the gun's firing, adding to the complexity and cost of the process. HVOF has become widely available.

HVOF coatings applied in wear applications provide superior performance in most situations compared to chrome. Compared to chrome, HVOF shows its strength in coating large parts. A plating tank for a large component could be very expensive to set up and maintain, but applying HVOF to a large surface requires no significant investment in terms of capacity, assuming the part fits in a standard cell. For small parts, chrome plating is better. Surface complexity of treated parts is also a factor. While chrome plating easily reaches the entire surface of a complex part, using HVOF is proportionately is more difficult. The inability of HVOF to be applied to some inner diameters and non-line of sight geometries, common to all thermal spray methods but more critical with HVOF, will continue to be a significant liability of the technique. Ultimately, the non-line of sight issue will place a fundamental limit on HVOF's market penetration.

Masking is more difficult in HVOF processing than it is in plating, with potential issues in surface transition areas. HVOF's chief disadvantage is its high up-front costs compared to other coating methods, including consumables and equipment. However, cost comparisons generally ignore long-term economic benefits such as faster TAT (turn-around-time), longer wear lifetime of parts, reduced hazardous wastes, etc.

On average, one HVOF cell is able to process a single landing gear in 40-minutes, with labor rates nearly the same as those for hard chrome plating. TAT for landing gear components is typically five days less than the average for chrome plated components. The advantage of HVOF, or any thermal spray methods, comes largely through the reduced process time. Total process hours for an HVOF application are as little as a fifth of electroplated hard chrome. The high cost of HVOF compared to plasma spray is somewhat mitigated by the finer powders used and denser coatings that result, because the surfaces typically need less finishing work.

Twin Wire Arc Spray

Twin Wire Arc Spray makes use of two wires of opposite polarity that are fed simultaneously and meet at a point, where arcing occurs and melts the wires. A blast of compressed air or inert gas atomizes the metal and forms a spray whose velocities often reach Mach 1. The method provides excellent deposition rates and are capable of depositing hundreds of pounds of material per hour. It is used primarily in relatively low-end corrosion protection applications, and in providing material buildup in refurbishing. It is also quite inexpensive compared to HVOF (quite portable and overall processing costs are about $10^{th}$ of HVOF). Good method for chrome substitution (used profusely in petrochemical industry). However, the density of the coating is about 92% compared to about 98.5% for HVOF. Low density is the greatest drawback. Also, the choice of materials is limited.

Cold Spray Technique

Cold spray process uses high velocity rather than high temperature to produce coatings, and thereby avoid/minimize many deleterious high temperature reactions, which are characteristics of typical thermal spray coatings. Typical advantages of cold spray coatings include compressive rather than tensile stresses, wrought-like microstructure, near theoretical density, and free of oxides and other inclusions. Moreover, the footprint of the spray beam is very narrow yielding high-density particle beam, which results in high growth rate of coating thickness with a better control over the shape of the coating, without masking requirements. The basic principle of cold spray is quite simple. When a particle-laden gas jet impinges on a solid surface, three different phenomena occur, depending on the particle velocity, $V_p$. When $V_p$ is low, the particles simply bounce (reflect) off the surface. When it reaches moderate values, they erode the surface. When it exceeds a critical value (which varies with particle and substrate materials—typically in the range of 500 to 900-m/s), particles plastically deform and adhere to the substrate, one another to form an overlay deposit, analogous to the thermal spray process.

The process uses a high-pressure, high-velocity gas jet to impart the velocity for the coating particles. The gas jet, preheated to compensate for the adiabatic cooling due to expansion, is expanded through a Laval nozzle to form a supersonic jet. Powder particles, transported by a carrier gas, are injected into this gas jet. Momentum transfer from the supersonic jet to the particles results in a high-velocity particle jet. These powder particles, on impact onto the substrate, plastically deform and form interlinking splats, resulting in a coating.

The gas delivery system supplies up to 170-$m^3$/hr (100-scfm) of nitrogen and or helium at the pressures of 15 to 40-bars (215 to 280-psi). An electric gas heater heats the gas to a maximum of 923-° K (1,200-° F.). Powdered coating material, in the size range of 5 to 45-microns, is delivered by the powder hopper and transported by a carrier gas to the gun. The control console houses all the controls to meter the flow rates, etc.

Cold spray is a solid state process and hence produces coatings with many advantageous characteristics. Since high temperature is not involved, it is ideally suitable for spraying temperature sensitive materials such as nanophase and amorphous materials, oxygen-sensitive materials like aluminum, copper and titanium and phase sensitive materials such as carbide composites. Due to small size of the nozzle (10 to 15-$mm^2$) and spray distance (5 to 24-mm), the spray beam is very small, typically around 5-mm in diameter, leading to good deposition. The process works similar to micro shot peening, and hence the coatings are produced with compressive stresses. Thus, ultra thick (i.e. 5 to 50-mm) coatings can be produced without adhesion failure. The high-energy low temperature formation of coating leads to a wrought-like microstructure with near theoretical density values.

Cold spray, owing to its principle of impact-fusion coating build-up, is limited to the deposition of ductile metals and alloys (Zn, Sn, Ag, Cu, Al, Ti, Nb, Mo, NiCr, Cu—Al, nickel alloys and MCrAlYs) and polymers, or blends >50% by volume of ductile materials with brittle metals or ceramics.

Major disadvantages of the cold spray process include the use of high gas flows, increased gas costs, especially in the case of helium, recycling would be needed. There are other problems such as abrasion of nozzles.

Powders

The dominant powder used as thermal barrier coating is yttria-stabilized zirconia (applied to gas turbine blades). Other powders are: WC, CrC, WC—Co, WC—Co—Cr (used as a chrome replacement material) and CrC—NiCr (used for protection against high temperatures of the order of 1,700° F., WC breaks down at about 800° F.).

Line of Sight (LOS) & Inner Diameter Issues

The inability of HVOF on NLOS geometries will ultimately limit the penetration of HVOF in aerospace to 80% in chrome replacement in aerospace, due to the fact that nearly 20% are NLOS, Plasma & HVOF gun extensions for inner diameters are commercially available but of limited usefulness. The coatings on the inner diameters are inferior. There are several problems in using HVOF equipment for small inner diameters, the limit at present being 2.5-in (63.5-mm).

Stripping and Grinding Issues

The bond strength, density and hardness that give thermal spray coatings their advantage also create their greatest difficulties in stripping and grinding (worse for HVOF). Grinding is usually performed to restore dimensional tolerances and to provide smooth finish. Surfaces coated with thermal spray & HVOF tend to be rough. Finishing requires not only an optimized process but also post-process grinding with a diamond wheel, which is significantly higher than the silicon carbide wheel used in chrome plating.

Stripping is a more significant problem. Unlike chrome, which undergoes less severe interaction with the substrate, HVOF involves molten metals at thousands of degrees applied to the surface, where they penetrate to form an alloy with the substrate and supply a molten surface to allow additional buildup. The consequence of the coating-substrate alloy formation is that some parent metal has to be sacrificed in removing the coating. Eventually a part that has been stripped may reach reduced dimensions where no more spray can be applied because it is no longer cost effective or no additional loss of substrate can be tolerated, and the part must be discarded. Stripping an HVOF coat may require leaving a part in a chemical stripping tank for a week, compared with a day for chrome. As a rule, the corrosion resistant alloys, such as WC—Co—Cr, CrNi and others, take longer and present more difficulties in stripping than WC—Co.

From the above, it is evident that there remains a need in the industry for more efficient stripping, prepping and coating techniques that do not give rise to the issues described above.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present invention provides a novel integrated system and related method for stripping, prepping and coating a surface. In general, if a surface is soft, for example titanium alloys, and has residual coating (after service), it can be stripped and prepped using a forced pulsed fluidjet (without abrasive particles). If the surface is hard, for example high-strength steels, it can be stripped and prepped using coating particles as blasting particles (i.e. abrasive particles) by entraining these particles into a fluid stream (or "fluidjet"). Once the surface has been stripped and prepped to a prescribed surface roughness, the surface may then be coated using the same type of coating particles, i.e. using coating particles having the same composition but possibly of a different mesh size. The coating particles are again entrained into the fluid stream. However, for the coating stage, the particles are preferably electrically charged, e.g. by passing the particle-entrained fluid stream through an electric field. The charged high-speed particles impregnate the surface, forming mechanical and electronic bonds with the surface. This integrated stripping, prepping and coating system thus enables a three-stage technique of first stripping with or without coating particles in the fluidjet, prepping the surface with or without coating particles in the fluidjet followed by a coating stage that is a hybrid of cold fluidjet spray and electro-coating techniques, using electrically charged coating particles.

Accordingly, one aspect of the present invention is a method of stripping, prepping and coating a surface. The method entails stripping, prepping the surface either just by a fluidjet (that is, without entraining coating particles) or entraining coating particles into a fluid stream to generate a coating particle-entrained fluid stream and directing the coating particle-entrained fluid stream at the surface to be stripped and prepped. The coating particles act as abrasive particles for stripping and then prepping the surface to a prescribed surface roughness required for subsequent application of a coating to the surface. The method further entails coating the surface by electrically charging the surface after the surface has been prepped to the prescribed surface roughness to thereby provide a charged surface and electrically charging particles having the same chemical composition as the particles used to prep the charged surface. The particles are charged to a polarity opposite to that of the charged surface. The method further entails directing a charged-particle-entrained fluid stream at high speed at the charged surface to thereby coat the surface with electrically charged particles that form both mechanical and electronic bonds with the surface.

Another aspect of the present invention is a system for stripping, prepping and coating a surface. The system includes a particle delivery subsystem for providing particles to be used for stripping, prepping and coating, a pump for pressurizing a fluid and a fluidjet nozzle. The particles are used only if the surfaces to be stripped and prepped are very hard. If the surfaces are soft, the particles will not be entrained in the fluidjet. The fluidjet nozzle has a fluid inlet connected to the pump or compressor for receiving the fluid from the pump or compressor, a particle inlet connected to the particle delivery subsystem for receiving the particles to be used for stripping and prepping, the nozzle entraining the particles into a fluid stream to produce a particle-entrained fluid stream, and an outlet for directing the particle-entrained fluid stream at the surface to thereby strip and prep the surface to a prescribed surface roughness. The particles will be entrained in the fluid stream only if necessary for stripping and prepping the surface simply by using a valve. The particles, electrically charged or neutral, depending on whether the surface is neutral or electrically charged, will be entrained in the fluidjet at the stage of coating the surface. The system further includes a direct current (DC) power supply, and a switch for switching the DC power supply between operative and inoperative states for electrically charging the surface to be coated after the surface has been prepped to the prescribed surface roughness and for generating an electric field to electrically charge particles having the same chemical composition as the particles used to prep the surface, the particles being charged to a polarity opposite to that of the surface. The nozzle directs a charged-particle-entrained fluid stream at high speed at the surface to thereby coat the surface with the particles.

BRIEF DESCRIPTION OF THE DRAWINGS

FIG. 9A is a schematic depiction of the electron shells of a copper atom;

FIG. 9B shows OH$^-$ ions approaching a copper particle;

FIG. 9C shows the negative tails around the copper particle;

FIG. 9D shows a first layer of surface charge drawing some positive ions (H$_3$O$^+$) loosely close to it to form a second, positively charged layer;

FIG. 9E shows the electrophoresis in which the ions in the second layer separate from the particle;

FIG. 14 is a cross-sectional view of an ultrasonic nozzle showing magnetic coils;

DETAILED DESCRIPTION

Figure 1:
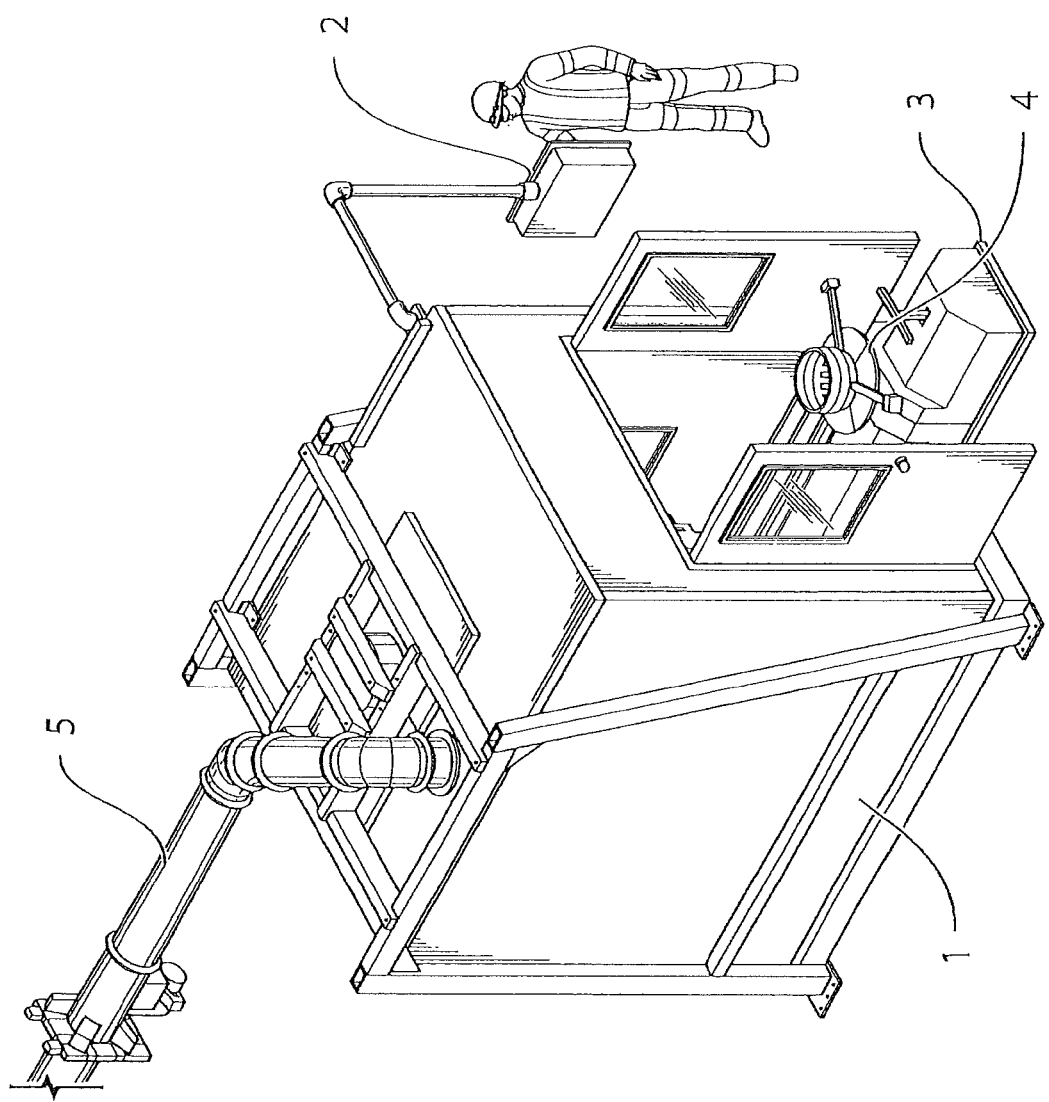
FIG. 1 is an isometric view of an integrated system in the form of a single booth or station for stripping, prepping and coating a part.

The present invention provides an integrated system and method for both prepping and coating a part or, alternatively for stripping, prepping and re-coating a part.

In general, and by way of overview, prepping of the surface is first performed using coating particles as disclosed by the applicant in U.S. Pat. No. 8,389,066 B2 issued Mar. 5, 2013) which is hereby incorporated by reference. U.S. Pat. No. 8,389,066 B2 discloses a novel method and system for prepping a surface that uses the same type of particles that are used for coating as blasting particles for first prepping the surface. This technique eliminates many of the disadvantages associated with conventional grit blasting. In the present invention, once the surface has been prepped using coating particles as abrasive particles, the same type of coating particles (which are generally of a smaller mesh size) are used for coating the surface.

Coating is then pertained by entraining the coating particles in a high-speed (e.g. supersonic) continuous or pulsed liquidjet or gasjet and by electrostatically charging the surface to be coated as well as the particles for high-speed electro-coating of the surface. In other words, in some embodiments of the invention, the surface is charged to a polarity opposite to that of the particles. The charged particles are made to impact at high velocity on the oppositely charged surface. This creates both mechanical and electronic bonds between the particles and the surface.

The integrated stripping, prepping and coating system enables a novel three-stage method for stripping, prepping and coating a surface of a part or object.

First, if the part to be coated is new, it needs to be prepped before applying the coating. The prepping of the part can be done either with the fluidjet only or by entraining coating particles as the blasting particles (i.e. as the abrasive particles) in the fluidjet to thereby prep the surface to a desired (prescribed or predetermined surface roughness). Second, once the surface has been prepped, the surface is then coated by applying to the surface the same type of particles that were used to prep the surface, i.e. the particles for prepping and coating have the same chemical composition.

Alternatively, if the part is old, that is, has been in service, the residual deteriorated coating needs to be stripped before prepping it to the required specifications. In this case, the three-stage process involves stripping, prepping followed by re-coating of the part. A very important aspect of this novel invention is that all three stages are carried out in one cell. In one embodiment, the coating particles have a diameter greater than 1 micron. The coating particles can be carried by a pulsed waterjet, a continuous waterjet, a pulsed airjet, a continuous airjet or any other pulsed or continuous fluid stream. Because the coating particle is used as the blasting particle, the problems associated with grit-blasting or prepping using a different particle than what is used to coat the surface are eliminated. The prepping stage not only saves time and cost as there is no need to clean or rinse the grit-blasted surface, but also reduces waste and cleanup time (because a different abrasive is not used). Furthermore, this prepping stage enhances the bonding or adhesion of the coating particle to the prepped surface since no foreign abrasive particles are embedded into the surface to be coated. Once prepped, the same type (composition) of coating particles is used to coat the surface. However, the coating particles are electrically charged while the surface is optionally oppositely charged. The electrically charged coating particles are then accelerated to high speeds to strike the surface to be coated.

The coating stage thus combines electrostatic and cold spray techniques. In the electrostatic spraying technique, the particles (powder) which are used as a coating material, are charged positively and are sprayed on the object to be coated, which is charged negatively. However, in the conventional electrostatic powder coating technique, the object is then heated to a very high temperature, so that the particles melt, flow and react chemically to form a coating. In the present invention, the heating process is eliminated by using the cold spray technique. In the cold spray technique, as described above, the particles are accelerated to very high speeds, and when they impact the object to be coated, they impregnate the surface and form purely mechanical bonds. Cold spray is also known in the industry as supersonic particle deposition. Regardless of its name, it is a process of coating a surface in which particles are accelerated to supersonic speeds while entrained in nozzle gas flow and are subsequently deposited by impact onto a surface. In some embodiments, the particles are accelerated in supersonic gasjets, e.g. to velocities up to 500-1000 m/s. As such, the technique may be used for coating soft substrates, for example, coating aluminum alloy parts with tungsten carbide particles. In at least some embodiments of the present invention, the charged particles are propelled to the same magnitudes of speeds as in the cold spray technique. Furthermore, if the fluid jet carrying the charged particles is a pulsed water jet, the impact pressure is the waterhammer pressure which enhances the impregnation of the particles deeper into the substrate (i.e. each subsequent pulse hammers the particles carried by the previous pulses into the surface). However, when the charged particles impregnate the negatively charged object, they form both mechanical and electronic bonds. Therefore, the adhesion of the coating to the substrate will be much stronger than achieved in either the cold spray technique or the electrostatic spray technique. By controlling the voltage difference between the particles and the object and by controlling the speed of the particles, the technique will achieve the same coatings as obtained in any of the thermal spray coating techniques, for example HVOF, without requiring a high-temperature flame.

In one embodiment, for particularly soft surfaces such as aluminum alloys, prepping can be achieved with a pulsed fluidjet without entraining abrasive particles (as disclosed in U.S. Pat. No. 8,550,873, which is hereby incorporated by reference).

In the various embodiments of this invention, which will be described below in greater detail, a pulsed or continuous waterjet or airjet apparatus is used to entrain a coating particle such as, for example, a thermal spray coating particle or other coating particle, that is to be applied to the surface after the surface prepping is complete. By entraining the coating particle into the fluid stream, the coating particle is thus used as an abrasive or blasting particle. In other words, the coating particle and the abrasive particle are the same, or at least highly similar in composition, hardness, granularity, etc. Conventionally, a surface is prepped using an abrasive to produce a desired surface finish or surface roughness. According to SSPC (The Society for Protective Coatings) Pocket Guide to Coating Information (SSPC 01-09), depending on the coating technique and the surface to be coated, various materials such as aluminum oxide (1680-44 microns in size), coal slag (1680-297 microns), copper slag (1680-149 microns), garnet (841-149 microns), glass beads (595-37 microns), silicon carbide (500-63 microns) are employed for prepping the surfaces. This surface finish or surface roughness is typically determined ahead of time by the type of coating particle that is to be applied. Thus, empirically, it is known that optimal particle retention (coating-surface adhesion) is achieved by prepping the surface to within a certain range of surface roughness. In the prior art, the surface is then typically prepped to within that desired range of surface roughness using a standard abrasive particle (blasting particle) such as, for example, grit, garnet or Zeolite. Remnants of foreign blasting particles (abrasive particles) can remain embedded in the atomic matrix of the surface being prepped. These embedded particles can reduce the adhesion of the subsequent coating and/or create local points of weakness leading to unpredictable failure. This problem is obviated by using the coating particle as the blasting particle (abrasive particle), which ensures that no foreign particles remain after prepping. If coating particles are embedded into the atomic matrix of the surface being prepped, then this has no deleterious effect since this particle would have been applied to the surface eventually in the subsequent coating operation. Particles that do not adhere to the surface can be reused or recycled for the subsequent coating stage.

In one embodiment, coating particles of a different granularity (mesh size) can be used to prep the surface prior to application of the coating. For example, the coating particles used for prepping may be larger in mesh size than the coating particles used for coating. Using a larger particle to prep the surface is advantageous as these larger particles more closely resemble the larger grit-blast particles that are traditionally used for surface prepping. Despite their larger mesh size, these larger coating particles tend to become smaller in mesh size as they impinge on the surface and are themselves blasted by subsequently impinging particles. A large proportion of the particles that fail to adhere to the surface tend to be these particles of a reduced size. These reduced-size (non-adhered) particles, however, are ideal for coating operations because coating particles used for actually coating should have a smaller mesh size than those used for blasting/abrasion. Accordingly, these reduced-size particles can be recycled and reused, with optional filtering, for subsequent coating of the prepped surface.

Various embodiments of the present invention will now be described below, by way of example, with reference to the attached drawings.

FIG. 1 is an isometric view of a single integrated ("all-in-one") system or apparatus in the form of a single station, cell or booth for stripping, prepping and re-coating a part. In other words, FIG. 1 depicts an integrated fluidjet system for sequentially stripping, prepping and coating a part to be refurbished. In general, the integrated system includes a cell defining an enclosure and having a door, a jig for holding the part inside the cell, a robotic arm movable within the cell, a nozzle mounted on the robotic arm; a pressurized fluid source for supplying a pressurized fluid to the nozzle to enable the nozzle to generate a fluidjet capable of sequentially stripping, prepping and coating the part, and a human-machine interface (HMI) external to the cell for receiving user commands and for controlling the robotic arm and fluidjet exiting from the nozzle in response to the user commands. The HMI may include a control panel with buttons, switches, keys, keypads, etc. and/or may include, or be connected to, a computer, computer network, server or other computing device having a microprocessor, memory and user interface. The HMI permits the user to control the movement of the robotic arm and the nozzle, the speed of the turn table, the exhaust fan, and the mode of operation (stripping/prepping/coating). The HMI may also be used to control the DC power source that generates the electric field (the "electric field generator"), the optional magnetic coil that generates the magnetic field (the "magnetic field generator"), and the optional induction heater that heats the particles. The HMI may also be used to control the particle delivery subsystem or particle metering subsystem that regulates the amount of particles entering the nozzle. The HMI may be used to provide direct commands to displace the robot or may be programmed with a sequence of commands for autonomous or semi-autonomous operation of the system. In simpler embodiments, the robotic arm may be replaced with an XY gantry, XYZ gantry or other mechanism. In other embodiments, the nozzle may be fixed in space and the part being refurbished is gripped and moved relative to the nozzle by a robotic arm, gantry or other mechanism.

In the embodiment shown by way of example in FIG. 1, the system includes a cell 1 containing a robot (or robotic arm) and accessories for stripping, prepping and re-coating a part 4. The cell may also be referred to herein as a booth or station. The system includes an HMI (human-machine-interaction) monitor 2 for the operator. The system includes a turntable 3 or any other equivalent device for mounting the part to be stripped, prepped and re-coated. A typical part 4 is mounted on the turntable for stripping, prepping and re-coating. An exhaust system 5 with a strainer removes the water mist from the cell. The single integrated system for stripping, prepping and re-coating a part is a radical improvement over the prior art which conventionally has used separate processes or apparatuses to strip parts, prep the parts and then re-coat the parts. The novel integrated system strips, preps and re-coats at a single location without having to transport, move or relocate the part. The system strips the part using a fluidjet. Prepping is also performed with the same fluidjet, although the fluidjet may be have different fluid dynamic properties (pressure, velocity, standoff distance, etc.). The same fluidjet (again optionally with different operating parameters) is then used as a carrier of coating particles to re-coat the part.

Figure 2:
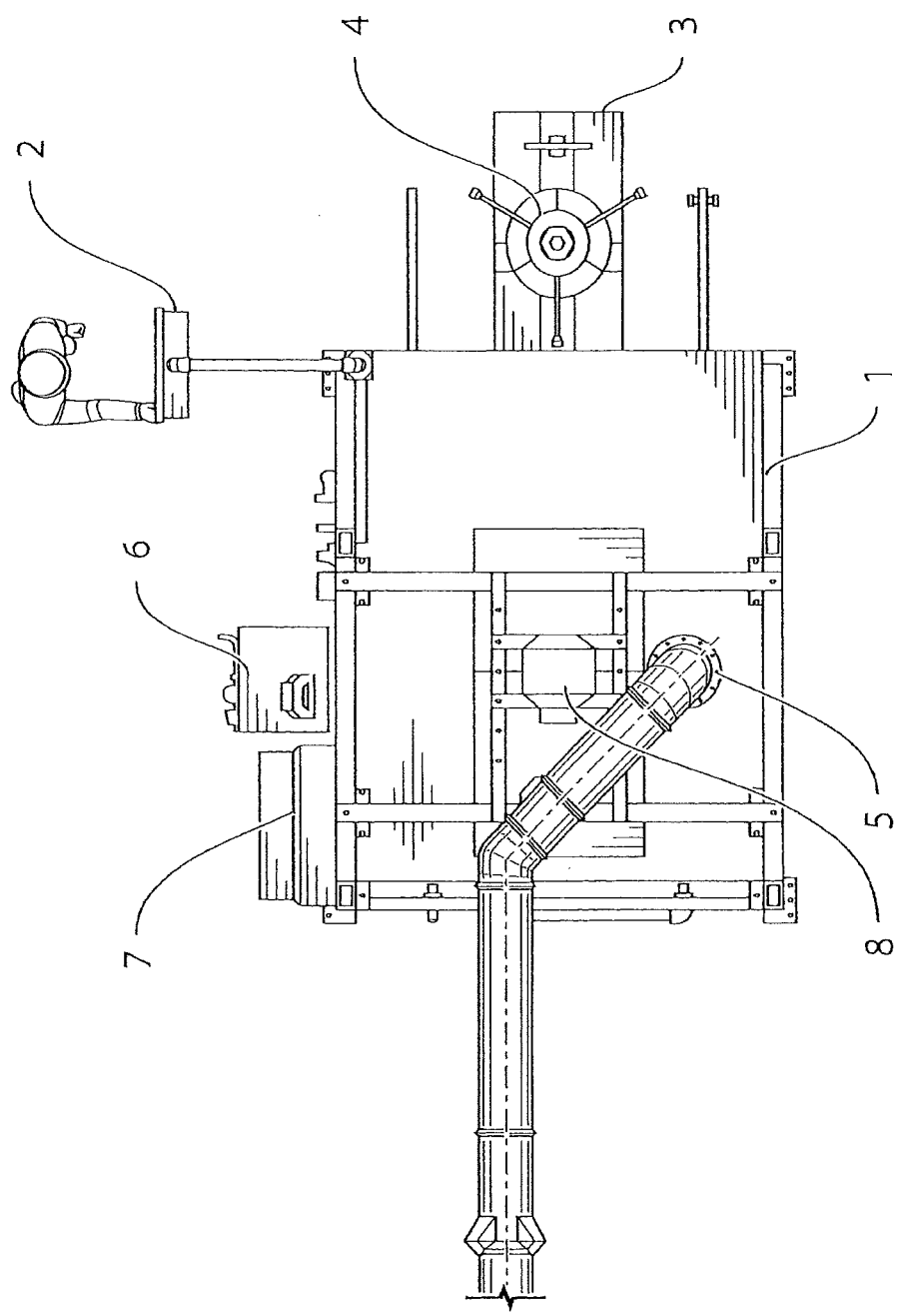
FIG. 2 is a top view of the system of FIG. 1.

FIG. 2 is a top view of the cell (or booth or station) introduced in FIG. 1. As shown in FIG. 2, the system includes the HMI assembly 2, the robot 8, the turntable 3, and #5 denotes the exhaust system 5. FIG. 2 further illustrates the robot control unit 6 and the electrical enclosure 7, which includes the ultrasonic generator for generating the pulsed jet.

Figure 3:
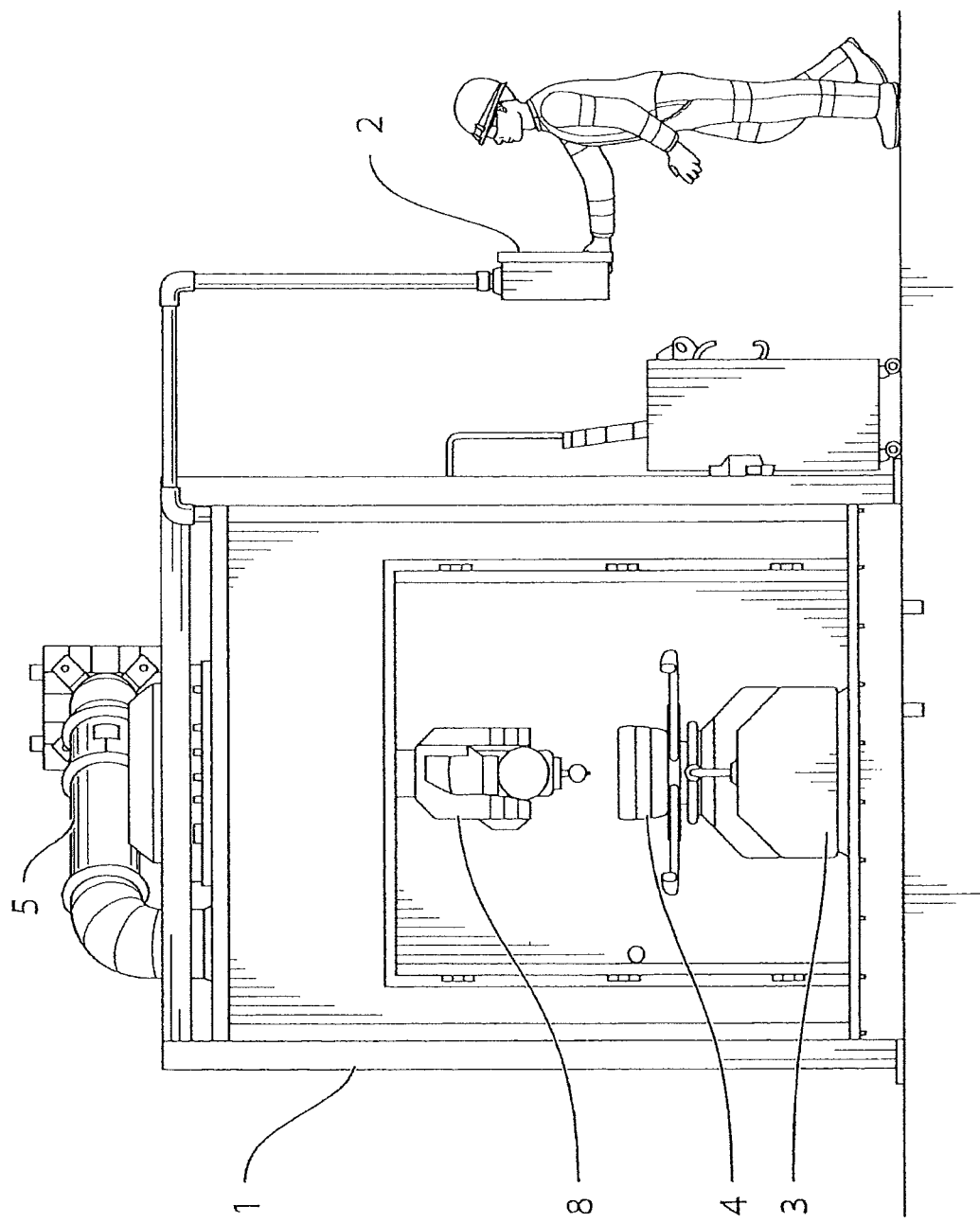
FIG. 3 is a side view of the system of FIG. 1.

FIG. 3 is a side view of the cell (or booth or station) of FIG. 1 and FIG. 2. In FIG. 3, the HMI assembly 2 and the cell 1 are shown as well as the robot 8, part 4, turntable 3 and exhaust system 5.

Figure 4:
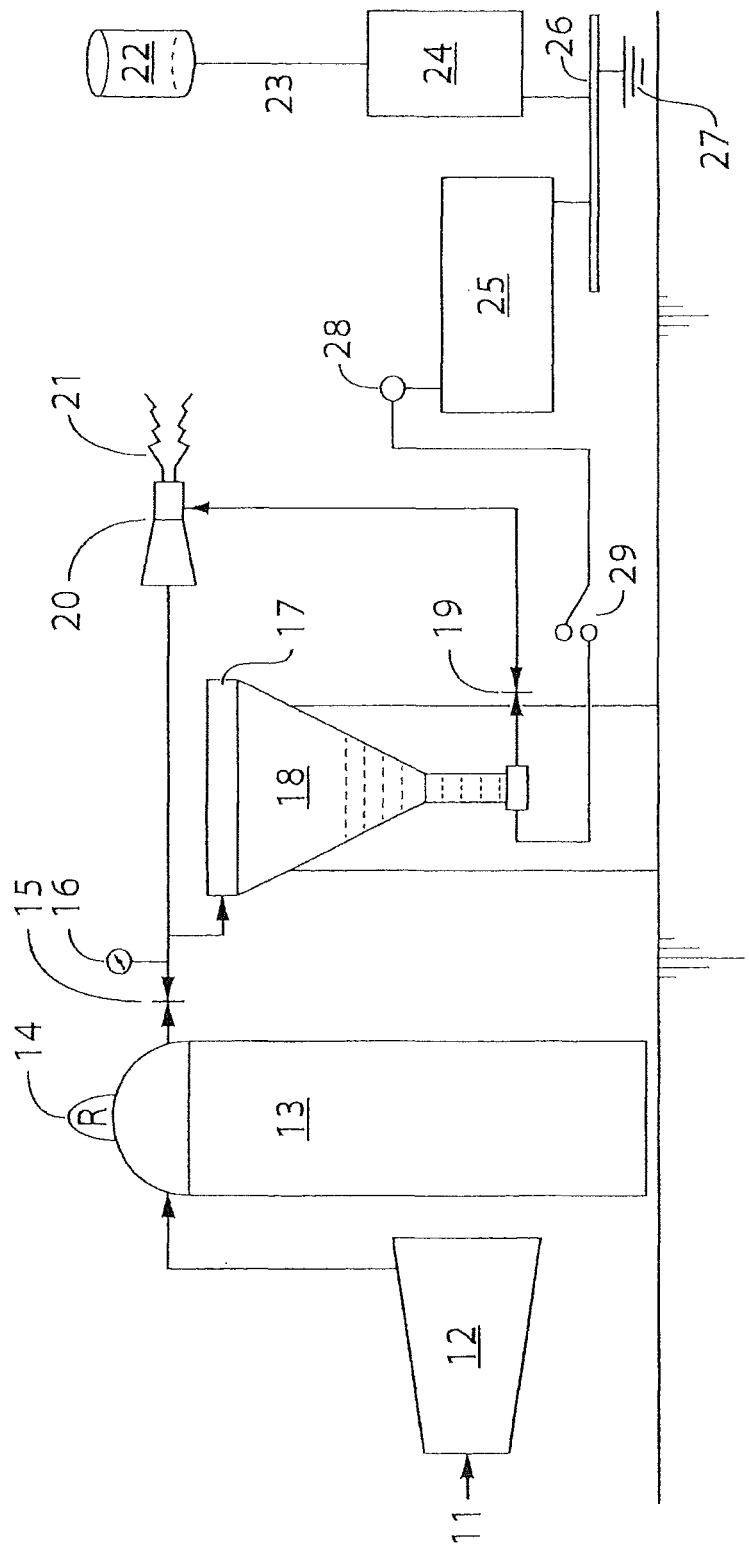
FIG. 4 is a schematic depiction of a gasjet system for prepping and coating in accordance with an embodiment of the present invention.

FIG. 4 depicts an airjet system having an air inlet 11, a compressor 12, an air reservoir 13, an air pressure regulator 14, a valve 15, and a pressure gage 16. A control system may be provided to receive signals from the pressure gage and to control the valve based on these signals. As shown in this figure, pressurized air is delivered to the airjet nozzle 20 which entrains particles 18 from the hopper 17 to produce a particle-entrained airjet 21. This airjet nozzle 20 may be an ultrasonically modulated airjet nozzle for producing a pulsed airjet. Alternatively, the airjet nozzle may be a continuous flow (non-pulsed) nozzle. In other words, the resultant particle-entrained airjet 21 may be a pulsed airjet or a continuous flow airjet. The air can be replaced by an inert gas if required.

As further depicted by way of example in FIG. 4, the airjet system includes a metering valve 19 for regulating the flow of particles from the hopper 17 into the airjet nozzle 20. The metering valve may be microprocessor-controlled. The airjet system of FIG. 4 therefore comprises a particle delivery subsystem (that includes the hopper and the metering valve) connected to the airjet nozzle for delivering a supply of coating particles to the nozzle. The airjet system may also include a control system (e.g. microcontroller) for controlling the particle delivery subsystem to regulate the quantity of particles being entrained into the airjet. The air can be replaced by an inert gas if required.

Particles are directed at a part 22 (or component or substrate) having an exterior or exposed surface. This part 22 may be supported by a workpiece support, holder, clamp or jig 23. A rotating device 24 may be provided to rotate the part 22. The angular velocity (rate of rotation) of the rotating device may be microprocessor-controlled to achieve variable particle deposition rates. The microprocessor may control both the angular velocity of the rotating device and also the metering valve to regulate the rate of particles striking a given unit area of the part.

As further depicted by way of example in FIG. 4, the airjet system includes a direct current (DC) power supply 25 for charging the particles and the part. A grounded bar 26 and ground 27 may be provided as shown by way of example in FIG. 4. The DC power supply 25 may be connected to a positive electrode 28 as shown by way of example in FIG. 4 which is then connected to a high-voltage switch 29. When the switch 29 is turned on, the circuit is closed, thereby charging the particles 18 as they flow into the airjet nozzle 20. Particles may be charged before they reach the airjet nozzle (as in this set-up) or after they are entrained into the fluid jet (as shown in FIG. 5).

Figure 5:
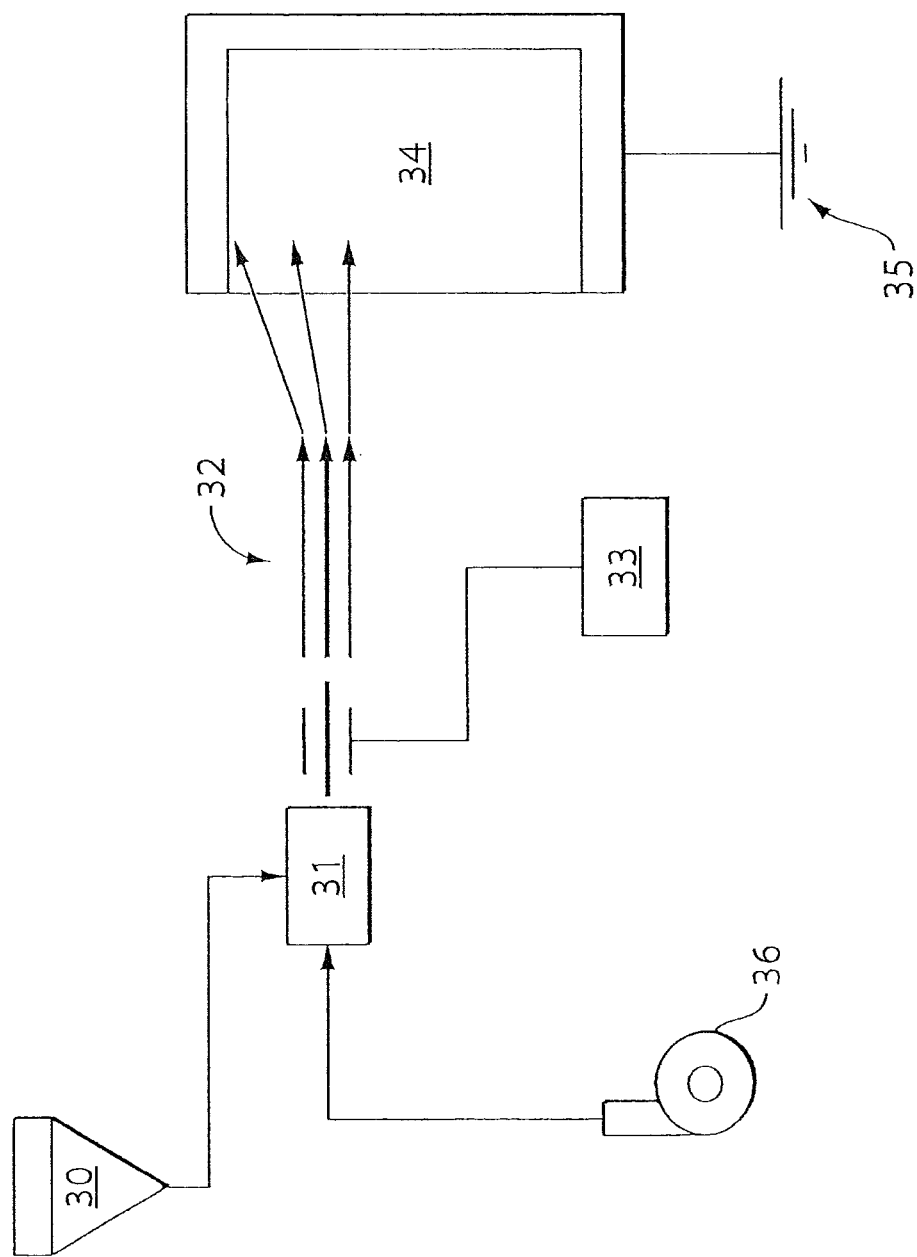
FIG. 5 is a schematic depiction of a liquidjet system for prepping and coating in accordance with another embodiment of the present invention.

FIG. 5 schematically depicts a waterjet system for prepping and coating a surface of a part. The waterjet system shown by way of example in FIG. 5 includes a particle hopper 30. A microprocessor-controlled metering valve (which is not shown in this figure) may be connected downstream of the hopper to regulate the flow of particles into the waterjet nozzle. The hopper and metering valve together form a particle-delivery subsystem. The waterjet system of FIG. 5 also includes a high-pressure water pump 36, a waterjet nozzle 31, a direct current (DC) power supply 33 that provides a sufficient voltage potential to electrically charge the waterjet-entrained particles to thus generate electrically charged particles 32 (or powder). The DC power supply 33 may be, in one example embodiment, connected to an electric field generator having two plates or electrodes. The electric field generator may be responsive to a variable voltage of the DC power supply to enable the system to control the intensity of the electric field (or ionizing electric field). In the depicted embodiment, the particles (powder) are positively charged whereas the part is negatively charged. The particle-entrained fluid stream impinges on the surface of the part 34 to be coated. The part to be coated made be held in a fixed (static) jig or it may be held in a rotating jig. As shown in the example configuration depicted in FIG. 4, the part 34 is connected to ground 35.

In one embodiment, the waterjet nozzle 31 may be an ultrasonic waterjet nozzle. A pulsed waterjet nozzle may be used to entrain the coating particles into a pulsed (modulated) waterjet. Pulsed waterjet technology has been developed by Applicant and has been disclosed in U.S. Pat. No. 7,594,614 (Vijay et al.) entitled ULTRASONIC WATERJET APPARATUS and in U.S. Pat. No. 5,154,347 entitled ULTRASONICALLY GENERATED CAVITATING OR INTERRUPTED JET which are hereby incorporated by reference. The fundamentals of the technique are explained using FIGS. 6 to 9 and some examples of suitable ultrasonic nozzles will be described below with reference to FIGS. 10-14.

Figure 6:
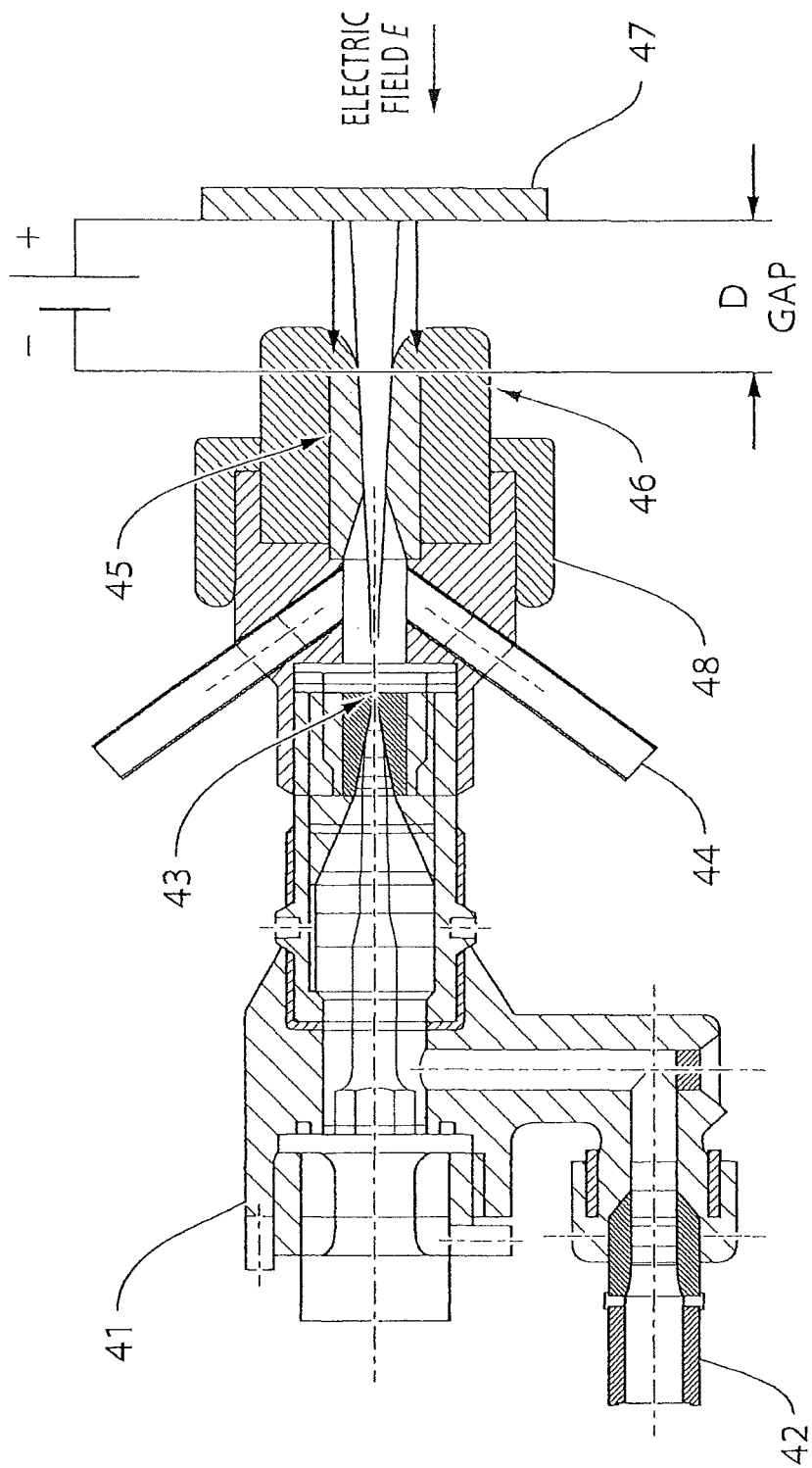
FIG. 6 is a drawing showing the overall ultrasonic nozzle system, particle feeding ports and the setup of electric field; is a schematic depiction of a nozzle applying an electric field on coating particles.

FIG. 6 illustrates an exemplary ultrasonic nozzle 41. High-pressure water (or other liquid) enters the nozzle through the inlet 42. The ultrasonic probe 43 when energized generates high-frequency pulsed liquidjet and entrains the coating particles, which are fed into the chamber through the ports 44. When the ultrasonic power is turned off, the nozzle generates conventional continuous liquidjet. The particle-entrained continuous or pulsed slurry jet enters the metallic orifice (tube) 45 which is grounded. Although not shown in FIG. 6, the inside surface of this tube is coated with a thin layer of (~10 μm) of insulating material such as aluminum oxide. The part (workpiece) 47 to be coated is placed at a standoff distance (D-gap) from the exit plane of the grounded tube, and is positively charged by connecting it to the high-voltage DC power supply. The electric field between the grounded tube and the surface of the part is given by $E=V_e/D$, where $V_e$ is the applied voltage. In order to achieve uniform coating, it is important to confine the electric field with or without electric spark (arc) from the tip of the grounded tube to the workpiece. However, unwanted sparking can potentially take place from any metallic part in the nozzle assembly to the workpiece. In order to prevent this unwanted sparking, the grounded metallic tube is enclosed in a plastic sleeve 46 secured by a plastic fastener, e.g. tightened by plastic nut 48.

Figure 7D:
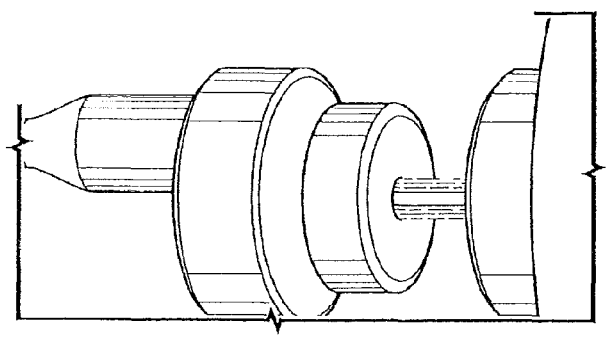
FIG. 7D shows arcing of a pulsed jet.
Figure 7C:
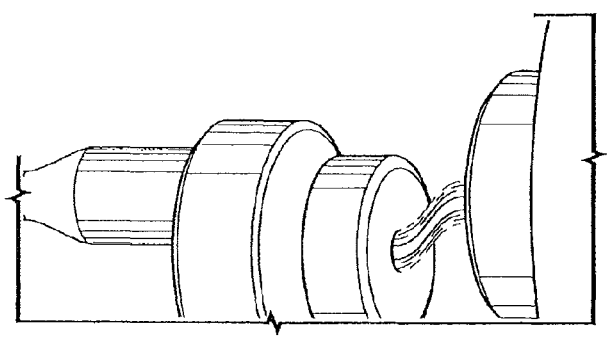
FIG. 7C shows arcing of a continuous jet.
Figure 7A:
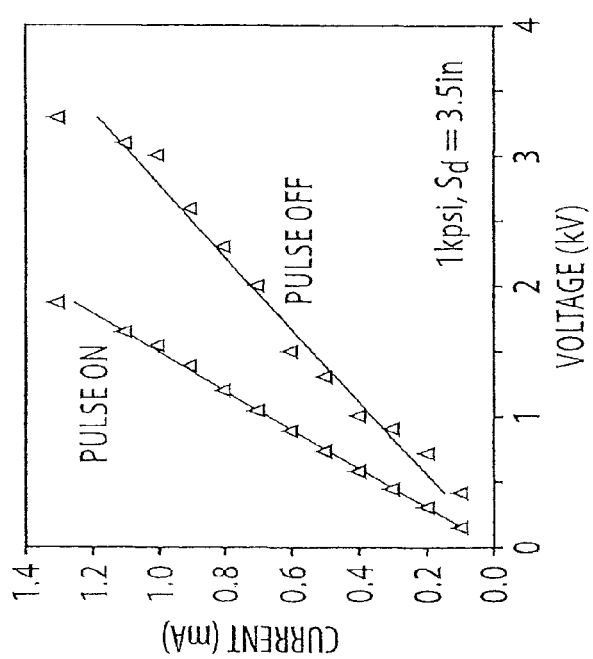
FIG. 7A shows a graph plotting current versus voltage with pulse on and with pulse off; shows the formation of arc (spark) when the electric field is applied between the grounded nozzle and the positively charged workpiece.
Figure 7B:
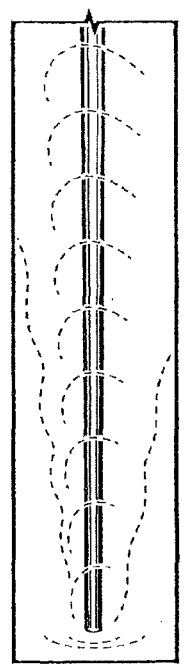
FIG. 7B shows a pulsed jet.

FIGS. 7A-7D show the effect of imposing an electric field between the grounded nozzle and the positively charged workpiece. As the voltage is gradually increased, the current through the liquid (water) increases (FIG. 7A). The fact that, for a given voltage, the current is higher for the pulsed jet than the continuous jet can be explained by the characteristics of the pulsed jet (FIG. 7B). As the resistance is given by: $R=\rho L/a_j$ ($\rho$=resistivity of water, L=length of the water column and $a_j$=effective cross-sectional area of the jet), and as $I=V_e/R$, the current for the pulsed jet increases as $a_j$ is larger than the continuous jet. This implies that, for a given voltage, the electric field will be much higher than a continuous jet. FIG. 7C and FIG. 7D appear to confirm this observation. In the case of a continuous liquidjet (waterjet) the arcs (sparks) occur randomly from the mixing tube to the workpiece. When the jet is pulsed, the arc (spark) is confined to the jet (FIG. 7D). It should be noted that the arc, similar to plasma coating, may or may not contribute to the coating process. It is just an indication, for the given set of operating parameters (pressure, flow, standoff distance, etc.), that the maximum electric field has been achieved. This has a great bearing in coating simple and complicated parts (components) as elucidated in the following section.

Figure 8:
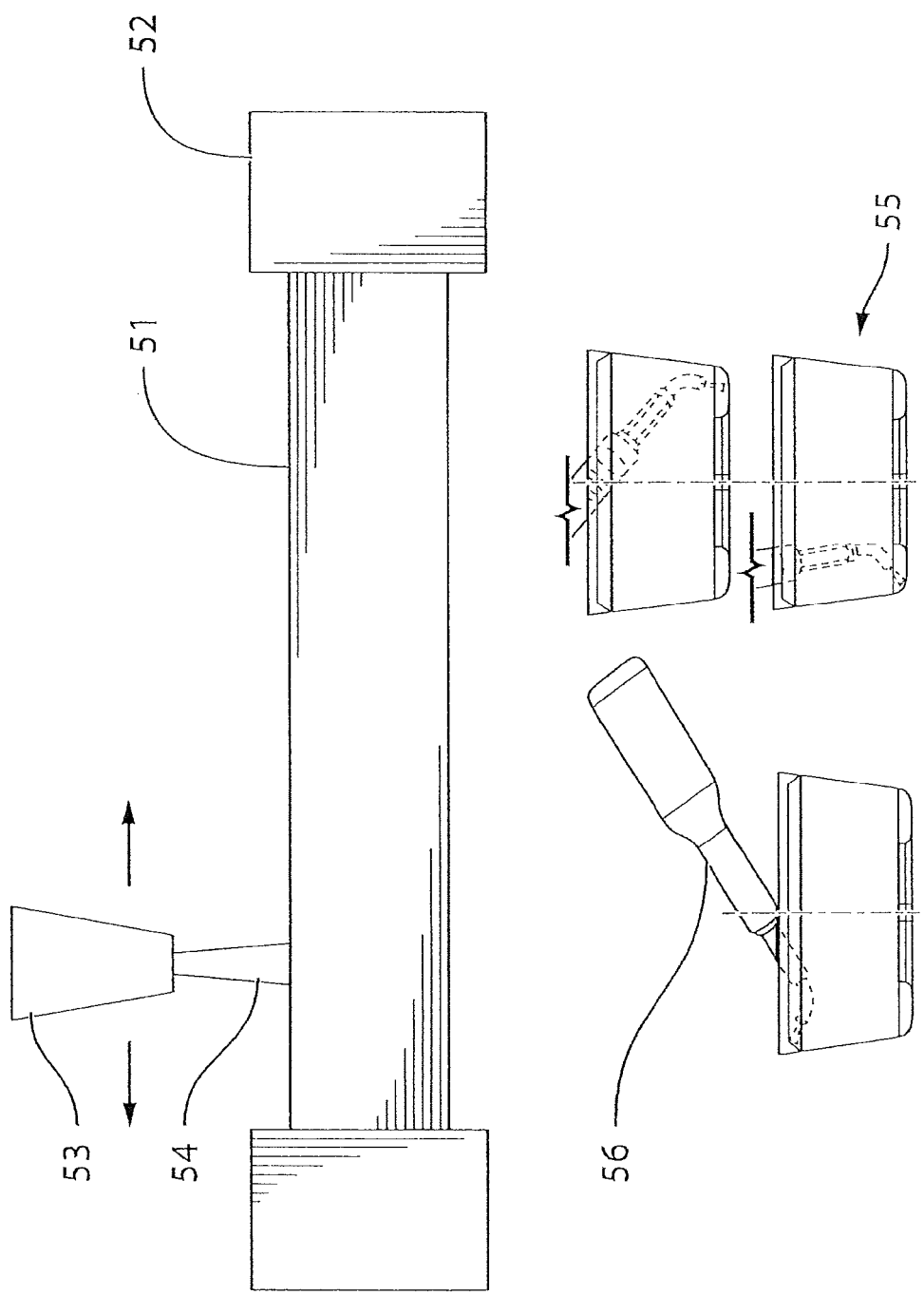
FIG. 8 shows simple and complex geometries of parts in industrial applications.

FIG. 8 shows a simple part such as a landing gear 51 supported in the bearings 52. In this case, all the operating parameters for stripping, prepping and coating can be established as the geometry of the part is simple. The nozzle 53 with the slurry jet 54 can be moved back and forth to achieve the desired coating characteristics. However, for a complicated part such as an aircraft combustor 55 the standoff distance for effective coating varies as the nozzle 56 moves from the top of the combustor to the bottom. If a certain value of the electric field is required for effective coating (≈3.6 kV/mm for tap water), this implies that the voltage needs to be varied as the standoff distance varies from the top to the bottom of the combustor. A microprocessor may control both the voltage of the electric field and the standoff distance based on data describing the geometry of the part to be stripped, prepped and coated.

Several phenomena accompany the flow of liquid (e.g. water) in insulated tubes. As is known, a triboelectric effect may occur in the flowing liquid (Ravalo, B. et al. "Demonstration of the triboelectricity effect by the flow of liquid water in the insulated pipe, Journal of Electrostatics, Vol. 69, 2011). This is simply is the transfer of electric charges from the inside surface of the insulated tube to the flowing liquid. This phenomenon may enhance charging of the coating particles in the liquidjet.

Another phenomenon which may enhance the coating process disclosed in this invention is the so-called electrical double layer formation. This is illustrated in FIGS. 9A-9E for the copper particles used as coating particles. It is known that water molecules will be automatically ionized to $OH^-$ and $H^+$ in the form of hydronium ion $H_3O^+$: $H_2O+H_2O \Leftrightarrow H_3O^+ + OH^-$ Once a metallic particle gets into the water, it will be surrounded by some water ions (both positive and negative). Due to the electronic structure of the metallic atoms and the water ions and electro-chemical properties, the water ions of only one electrical polarity (negative or positive ions) is absorbed onto the metallic particle and formed the first layer of surface charge on the surface of the metallic particle or the interface between the water and the particle. This layer is tightly bounded to the surface. Because of the first layer of charge, some counter-ions will be drawn to this layer of ions and form the second electrical layer of the counterpart of the first. The second layer is very loosely connected to the first layer.

The copper particle has 29 electrons outside the nucleus, one electron at the outmost orbit, as shown in FIG. 9A. The negative ion Hydroxyl radical OH— is a polar ion. The negative (−) is the valence bond. When the $OH^-$ ion approaches the Copper particle, it will see the valence electron (the outmost electron) of the copper particle, and naturally the positive end will share the electrons once they are in contact, therefore the ion forms bond with the atom at the surface and leaves the negative tail in the water. As shown in FIG. 9B and FIG. 9C, when the $OH^-$ ion approaches the copper particle, it will see the valence electron (the outmost electron) of the copper particle, and naturally the positive end will share the electrons once they are into contact, therefore the ion forms bond with the atom at the surface and leaves the negative tail in the water as shown in FIG. 9B and FIG. 9C. The first layer of surface charge will draw some positive ions ($H_3O^+$) loosely close to it and form the second layer of positive charged layer, as shown in FIG. 9D.

When an electrical field is applied to the metallic particle with electrical double layer, it will behave like a single charged particle and move along the electric field line to the electrode. This phenomenon is called electrophoresis. Under the action of the applied electric field, the ions in the second layer will separate from the particle charged with the opposite electric charges (ions) in the first layer. The ions in the first layer are still tightly bound with the particle and move with it as one. This process is shown in FIG. 9E. This phenomenon has been investigated for powder particle deposition, Electrophoresis Deposition (EPD). It is predicted that this phenomenon will prevail, which implies that the particles will retain their electrical charges in the liquidjet when impacting the workpiece. The benefit would depend on the type of particle used for coating (WC, WC—Co—Cr, etc.), and the type of the material of the workpiece.

Based on the observations made in the previous two sections, several embodiments of the nozzle configurations, particle injection systems and charging system are disclosed in the following sections.

In some embodiments of the system, the nozzle is a rotating pulsed fluidjet nozzle comprising an ultrasonic transducer for modulating the fluid stream, the nozzle comprising a rotating head having one or more angled outlets.

Rotating head nozzles are useful for prepping and coating internal surfaces such as the inside surface of a tubular structure.

Figure 10:
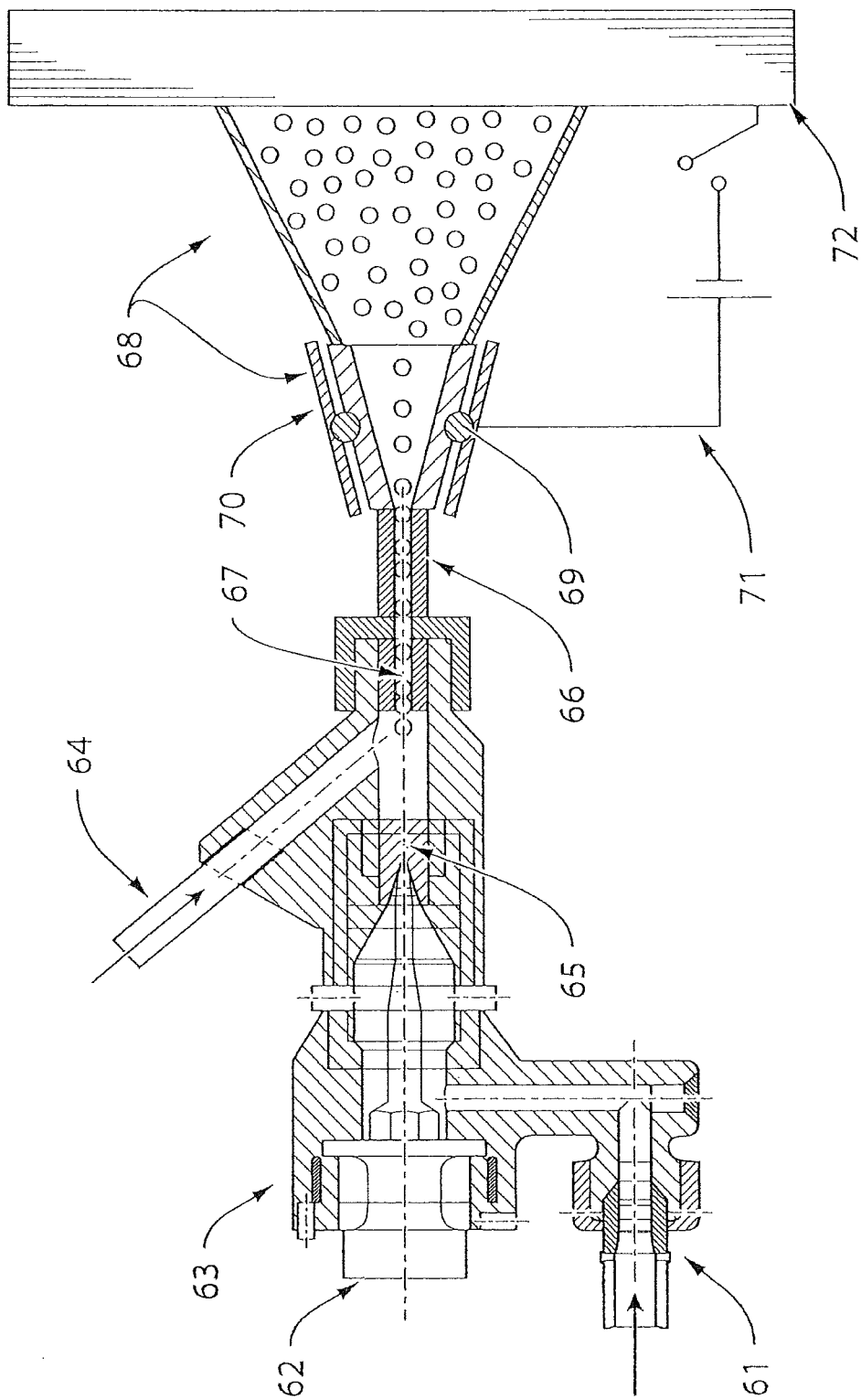
FIG. 10 is a schematic depiction of a nozzle applying an electric field on coating particles.

FIG. 10 depicts high-pressure water entering the nozzle housing 63 through the port 61. The nozzle housing includes a microtip (see, e.g. U.S. Pat. No. 7,594,641) driven by an ultrasonic transducer 62 which modulates the water stream flowing through the specially designed orifice 65 to generate high-speed and high-frequency forced pulsed waterjet. Coating particles, such as tungsten carbide, charged or neutral, are transported through specially designed tubes or tubing 64 into the mixing chamber 67. The extension tube of the mixing chamber is fabricated from an electrically insulating material, e.g. a suitable plastic or polymer. As an example, the composite material PEEK (polyetheretherketone) can be used as an insulators 66. The purpose of the insulating material is to prevent electrical arcing (or sparking, which is also called high-voltage tracking) from the nozzle body to the substrate (part) to be coated or, any other part shown in FIGS. 11 and 12. If the particles entering the mixing chamber are neutral, then they pass through the electric field generated by the electrodes 69, which are embedded between two plastic insulators 68, e.g. acrylic or PEEK. The electrodes are embedded between the plastic insulators for safety of the operators and also to prevent arcing between the electrodes and the substrate. In order to provide further safety, the particles are confined, before striking the substrate 72, in a tube, shown schematically as a diverging cone 70. The electrical field is generated by the high-voltage DC power supply unit 71.

The operating principle is as follows. The coating particles, accelerated by high-frequency pulses of water, will impact the substrate. In order to generate a uniform mixture of particles in the pulses, air can also be used to inject the particles in the mixing chamber. As disclosed in U.S. Pat. No. 8,691,014 and U.S. Pat. No. 8,389,066, at a certain speed, which is determined by the pressure, the particles will just prep the surface. When the electrical field is applied, they will enter the material matrix of the substrate and bond electronically with the atoms of the substrate, resulting in a coating with high bond strength.

Figure 11:
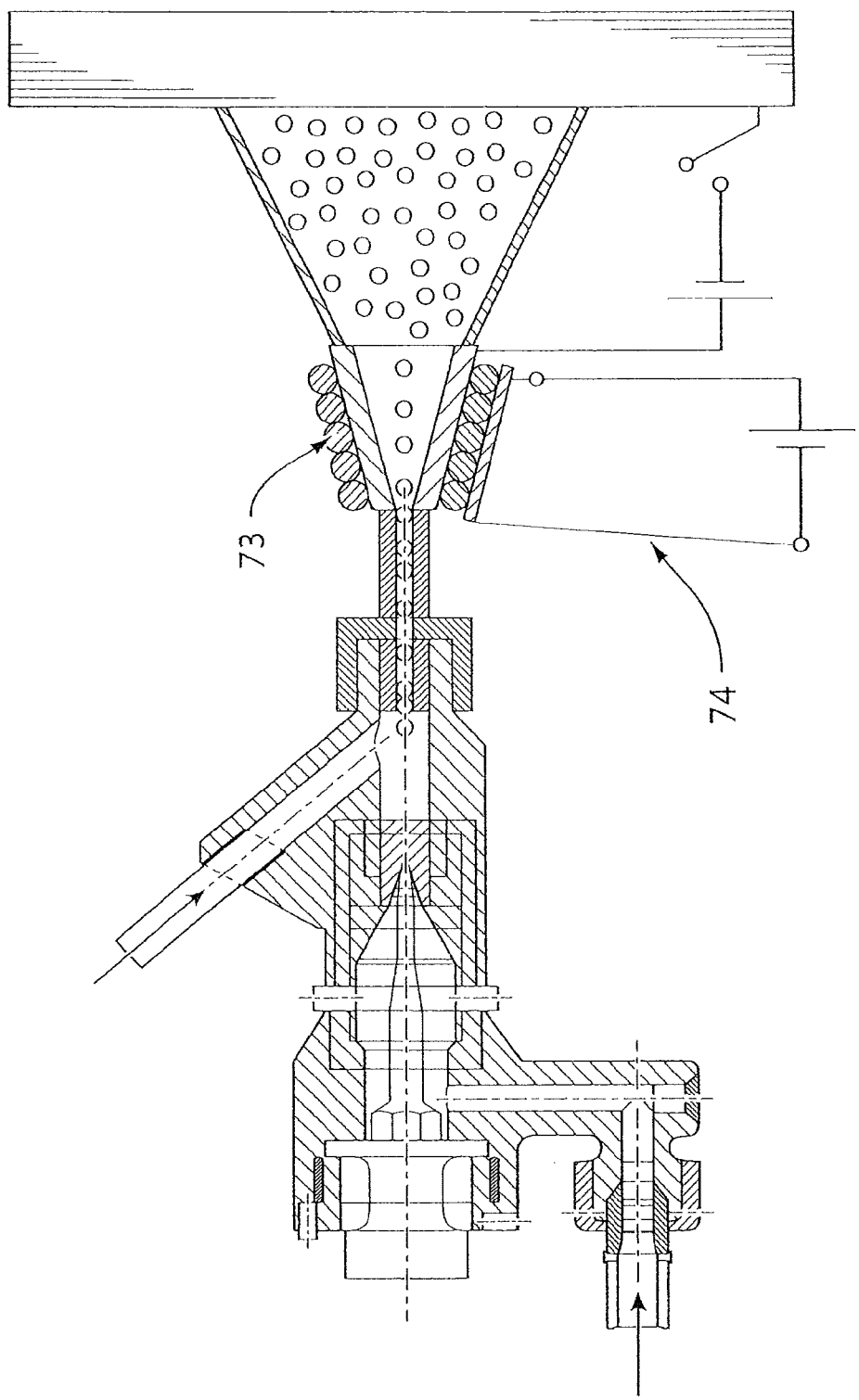
FIG. 11 is a schematic depiction of a nozzle applying both an electric field and magnetic field on coating particles.

FIG. 11 depicts an embodiment which, in addition to applying the electrical field, also applies a magnetic field. The embodiment of FIG. 11 includes a magnetic coil 73, like a solenoid, which may be added to keep the particles cohesive and focused to enhance their impact on the surface. The magnetic field circuit 74 can be supplied from the same DC power supply 71 of FIG. 10, or by an additional DC power supply.

Figure 12:
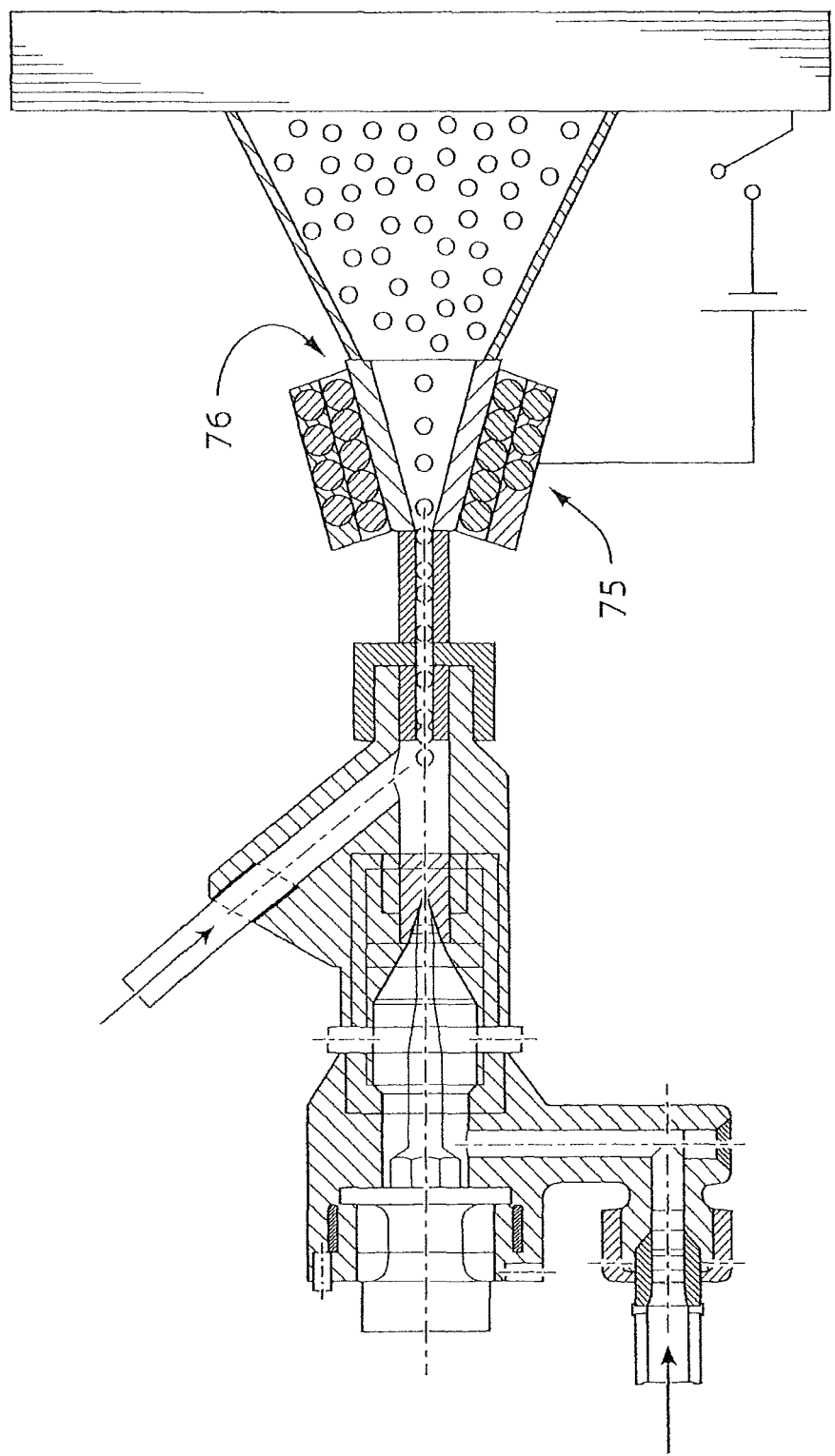
FIG. 12 is a schematic depiction of a nozzle applying an electric field, magnetic field and heat using induction heating coils to the coating particles.

FIG. 12 depicts an embodiment in which an induction coil 75 surrounds the electrode plates to heat the coating particles. The heating is provided by an induction heater 76. This is similar to cold spray techniques where the particles are heated to a low temperature compared to the temperatures involved in the HVOF technique. In addition to the electric field, heating of the particles may enhance the adherence of the particles to the substrate. It is believed that this combination will make this novel coating technique very versatile, will be superior to cold spray technique and will be competitive with the HVOF technique.

Figure 13A:
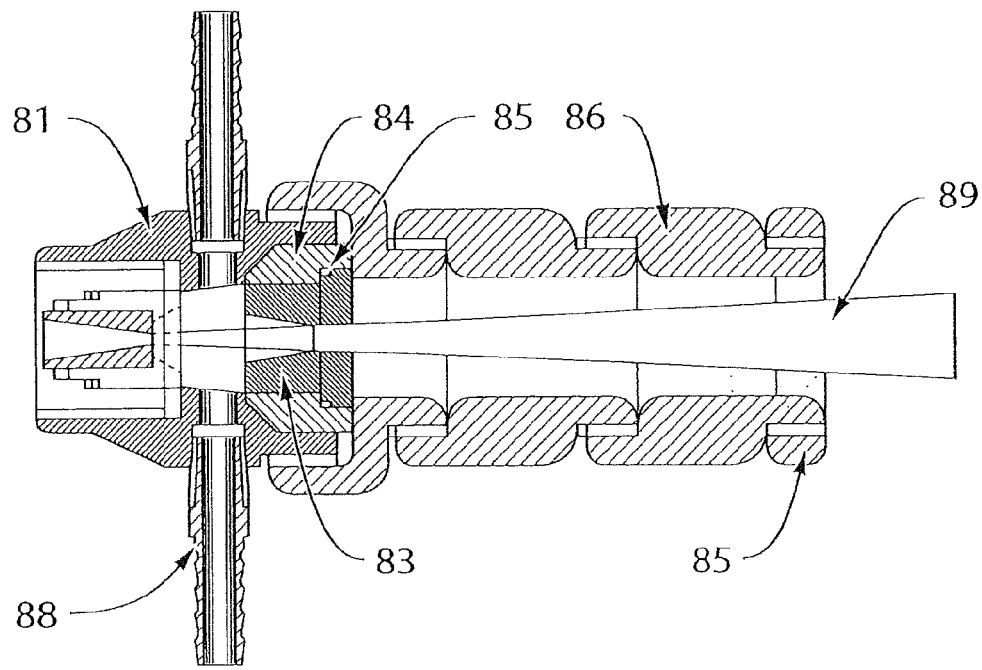
FIGS. 13A and 13B are cross-sectional views of a nozzle having insulating tubes for delivering charged coating particles.
Figure 13B:
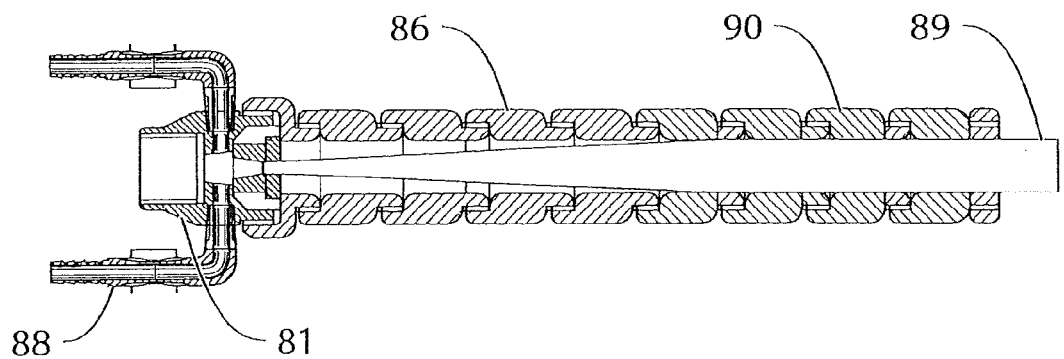

FIG. 13A and FIG. 13B illustrate nozzle configurations that eliminate undesirable arcs (sparks) from the grounded nozzle body to the workpiece. Electrical arcing occurs from sharp edges to any metallic part in the vicinity or even may generate coronas in the moisture (air-vapor mixture). For the embodiments of the invention disclosed in this application, this is an undesirable effect, which may have detrimental effects on the coating. When the edges of the components (champers) are curved, the possibility of unwanted arcing is reduced significantly. In the configurations shown in FIGS. 13A and 13B, the body 81 is connected to the ultrasonic nozzle assembly. The metallic conical insert 82 and the O-ring 87 are used for sealing the high pressure water. The electric field is generated between the grounded metallic mixing chamber (tube) 83 and the workpiece. Insetting insulating caps (shrouds) 84, 86 and Item 90, unwanted sparking is eliminated. The number of caps depends on the magnitude of the voltage applied to generate the electric field. For voltage of the order of 10 kV, one cap may be sufficient. If voltage of 100 kV is required, then the number of caps need to be increased as shown by Item 90. These caps are fabricated from high dielectric strength plastic materials. The caps are held in place by the nut Item 85, which is also a plastic material. Coating particles, either neutral or charged are injected into the mixing chamber by the feeding tubes Item 88 connected to a hopper (not shown in this figure). Addition of the caps also changes the shape of the pulsed or non-pulsed jet emerging from the mixing chamber Item 89.

FIG. 14 shows an embodiment of the ultrasonic nozzle assembly 91 incorporating a magnetic coil 97 to impose the magnetic field on the charged particles injected into the mixing chamber through the feed tubes Item 96. High pressure tap or deionized or ionized water enters from the pump through the high pressure fitting 95 into the nozzle. The magnetic field does not contribute to the acceleration of the charged particles towards the workpiece 94. However, the particles are confined within the liquidjet 98, pulsed or non-pulsed (continuous) emerging from the collimator tube 99. Nuts 91 and 93, fabricated from high dielectric strength plastic materials such as PEEK (polyetheretherketone), are used to fasten the collimator tube and the magnetic coil component to the ultrasonic nozzle assembly.

Figure 15:
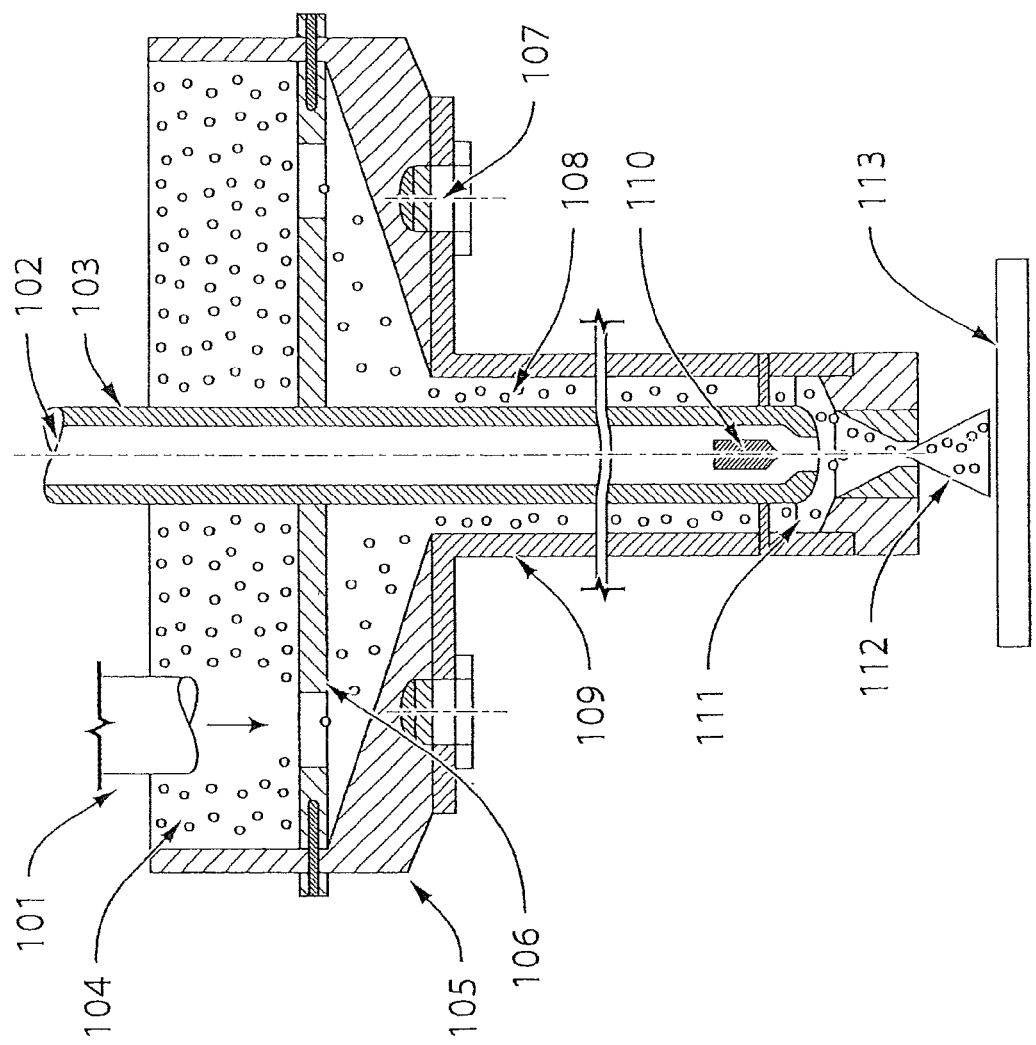
FIG. 15 is a cross-sectional view of an ultrasonic nozzle having an annular passage for delivering charged coating particles.

FIG. 15 shows another embodiment for charging the particles in the hopper and transporting through an annulus tube to impact on the surface (part). In this embodiment, charged coating particles are entrained in the fluidjet, in this case water, pulsed or non-pulsed. Shown is a tube 101 for injecting the coating particles such as tungsten carbide. Also shown is the inlet 102 for high-pressure water or other fluid. Also shown is a high-pressure tubing 103 with a layer of insulating material so that coating particles do not lose their charges, that is, do not become neutral. Also shown are the coating particles 104. A high-strength plastic or ceramic conical hopper 105 is provided for containing coating particles injected by compressed air. A metallic plate 106 is connected to a DC power supply to charge the particles. The plate could be either positively charged or negatively charged depending on the type of particles used for coating. Bolts (or other fasteners) 107 are provided for fastening the high-strength plastic tube or ceramic. The charged coating particles 108 flow through the annular space (annulus), carried by compressed air. A high-strength plastic or ceramic tube 109 is located coaxially with the high pressure tube for providing an annular path (outer annulus) for the charged particles. The inner surface of the tube (not shown in the figure) could be layered with a material for heating the particles (for example, fine-wire mesh). A microtip 110 produces a pulsed stream (in this case a pulsed waterjet). As the microtip is driven by an ultrasonic transducer, disabling the transducer produces a continuous stream of fluid (e.g. a continuous waterjet). The nozzle 111 produces the high-speed fluid jet. The jet could be a solid stream or, could be composed of droplets, i.e. a fanjet. The fluid jet could be pulsed or non-pulsed jet. The fluidjet 112 containing charged particles mixed with air escapes to atmosphere. The substrate 113 is the part to be coated with the coating particles. The plate could be charged negatively or positively depending on the polarity of the particles. Once the particles impact the substrate, they adhere to it by both mechanical and electronic bonds.

Figure 16:
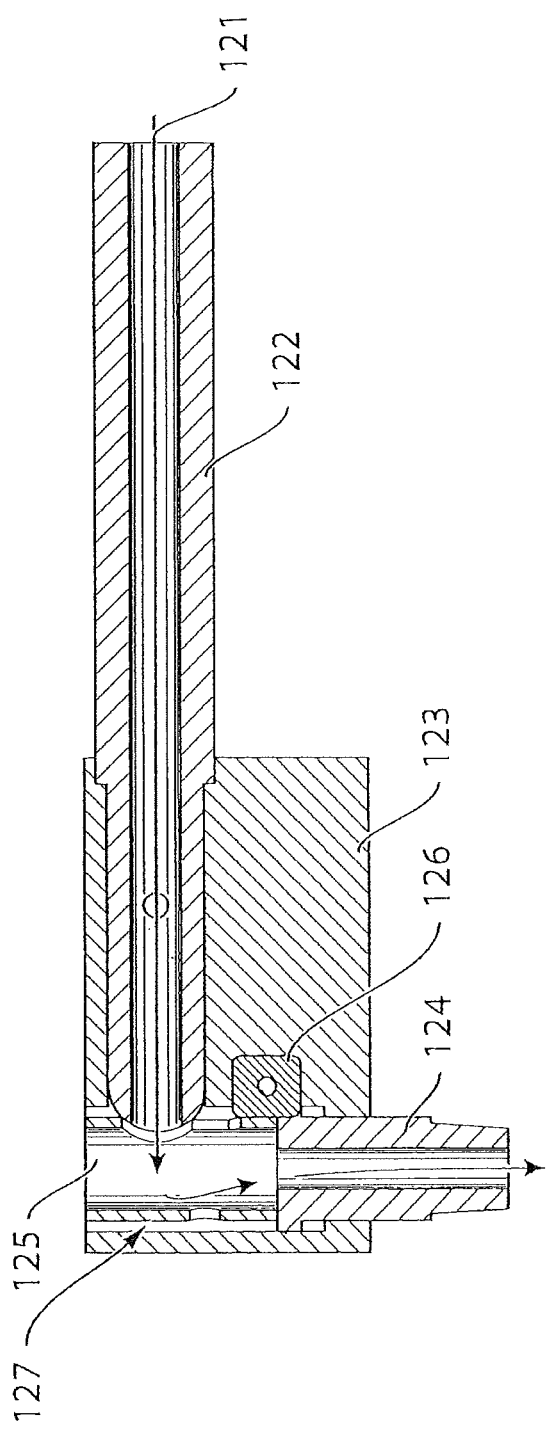
FIG. 16 is an embodiment for charging the coating particles.

FIG. 16 shows one embodiment for charging the neutral coating particles for injection into the mixing chamber. Particles, indicated by the arrows 121, enter the feed tube 122 and flow through the tube 124 connected to the mixing chamber. The housing 123 for charging the particles includes the high-voltage positive electrode 126 and the ground electrode 127. Neutral particles entering the housing due to the vacuum generated in the mixing chamber are subjected to the electrical field between the high-voltage positive electrode and the ground electrode. When they contact the ground they acquire negative charges before entering the mixing chamber. All components shown in FIG. 16, except the electrodes, can be fabricated from high-dielectric-strength plastic materials such as PEEK (polyetheretherketone).

Figure 17:
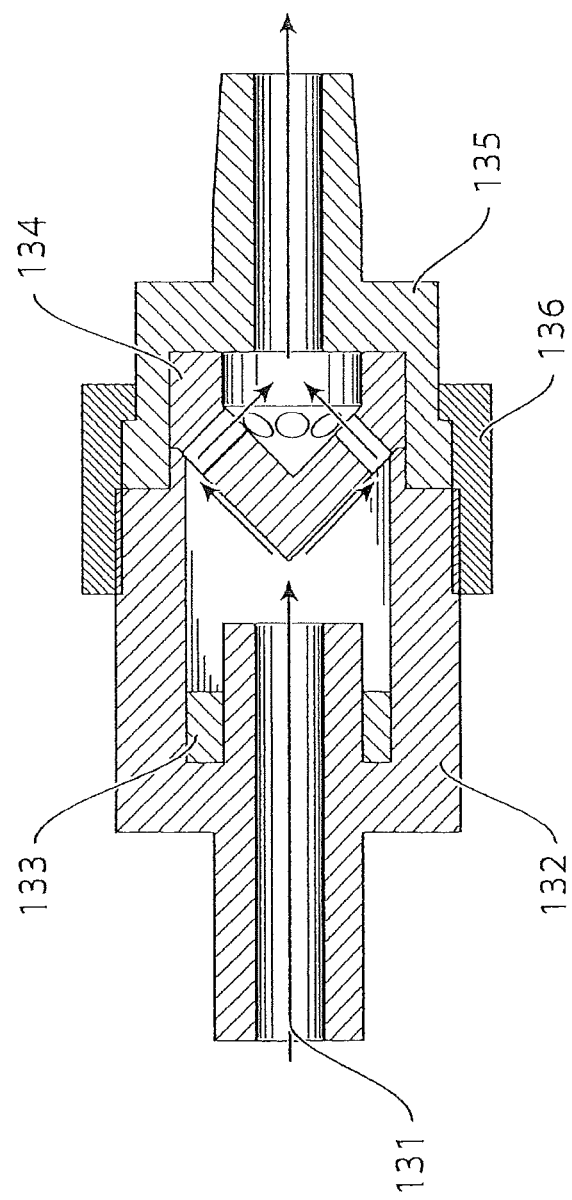
FIG. 17 is another embodiment for charging the coating particles.

FIG. 17 shows another embodiment for charging the neutral coating particles. Coating particles 131 enter the housing 132 and are subject to the electrical field between the high-voltage positive electrode 133 and the ground electrode 134. While flowing through the housing, they contact the ground electrode acquiring negative charges. The vacuum generated in the mixing chamber sucks the particles into the mixing chamber through the connecting tube 135. Since the paths of the particles in contact with the ground electrode are longer, most of the particles will be charged. The nut 136 is used to connect the tube 135 to the housing 132. All the materials shown in FIG. 17, except the electrodes, can be fabricated from a high-dielectric-strength plastic materials such as PEEK (polyetheretherketone).

Figure 18:
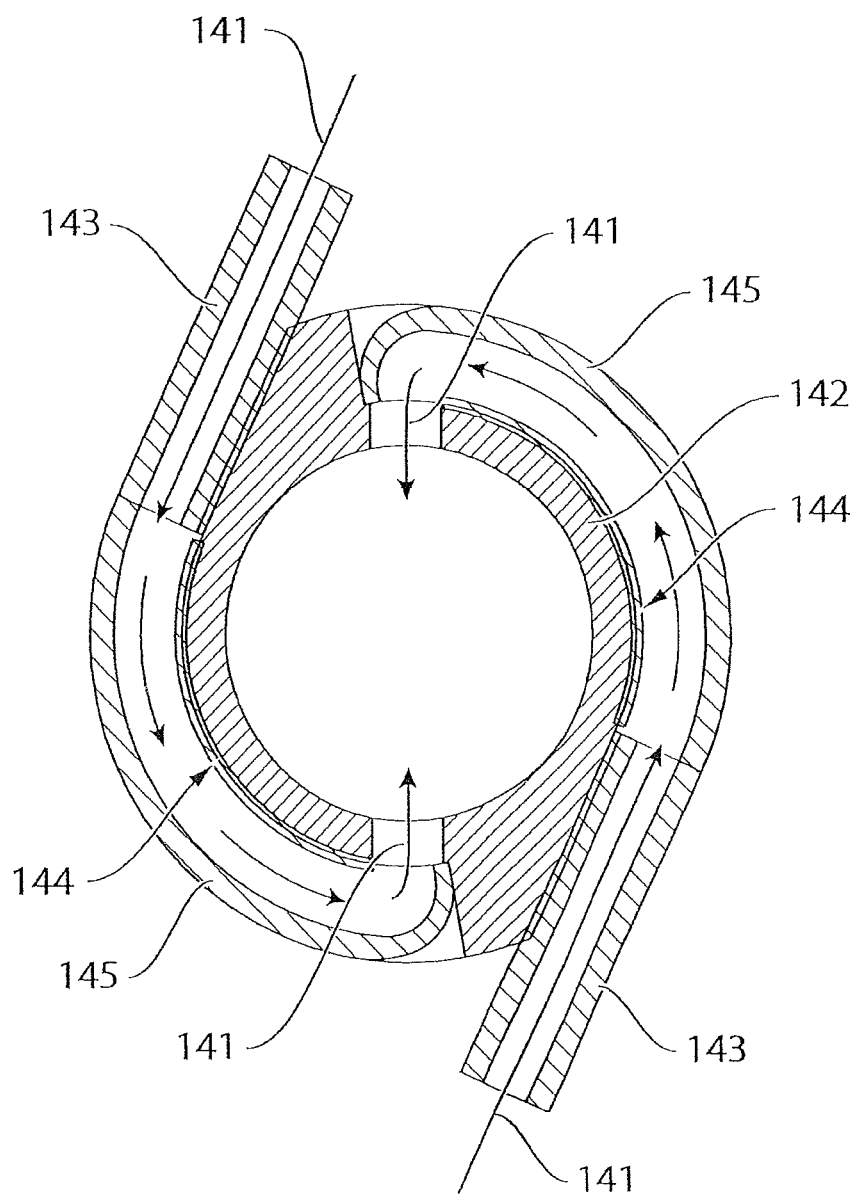
FIG. 18 is another embodiment for charging the coating particles.

FIG. 18 shows yet another embodiment for charging the neutral coating particles. Coating particles 141 enter the housing 142 through the inlet and outlet tubes 143. While flowing through the charging chamber 143, they are subject to the electrical field between the high-voltage positive electrode 144 and the ground electrode 145 and acquire negative charges by collisions with the ground electrode. Since the paths of the particles in contact with the ground electrode are longer, most of the particles will be charged. All the materials shown in FIG. 18, except the electrodes, can be fabricated from the high dielectric strength plastic materials such as PEEK (polyetheretherketone).

Figure 19:
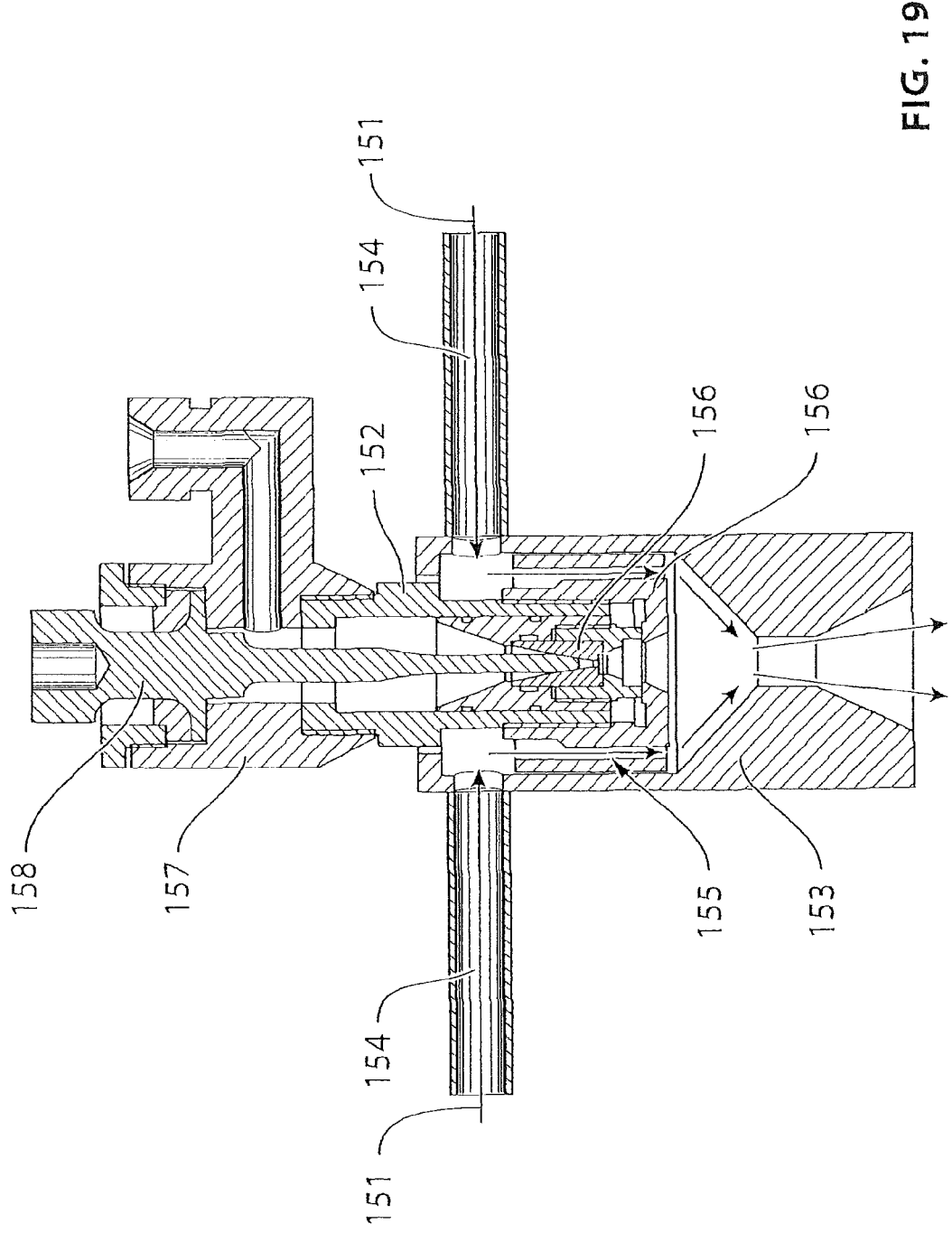
FIG. 19 is yet another embodiment for charging the coating particles.

FIG. 19 shows an ultrasonic nozzle assembly in accordance with an embodiment of the present invention. This ultrasonic nozzle assembly is designed to charge neutral coating particles while flowing through the ultrasonic nozzle assembly 152. Coating particles 151 enter the mixing chamber within the mixing chamber body 153 through feed tubes 154, and flow through the annular space as indicated by the arrows. While flowing through the annular space, they are subject to the electrical field between the high-voltage positive electrode 155 and the grounded nozzle cap 156 and acquire negative charges by collisions (friction) with the ground electrode. The nozzle has a housing 157 into which the high-pressure water enters. The ultrasonic probe 158 includes the ultrasonic transducer and microtip which are driven by an ultrasonic generator. The mixing chamber body 153 is electrically insulated and can be fabricated from one or more high dielectric strength plastic materials such as PEEK (polyetheretherketone) which exhibits a dielectric strength of about 500 V/mil. Other high dielectric strength thermoplastics may be employed in other embodiments, e.g. acrylic, PVC, nylon, PTFE, etc. In the embodiment depicted by way of example in FIG. 19, the coating particles are charged in the annular passageway that is concentric with the microtip.

Figure 20A:
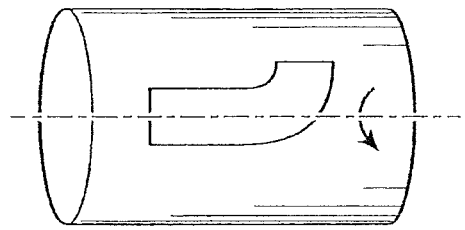
FIG. 20A schematically depicts a first example of a rotating head nozzle having an elbow bend leading to an orthogonally angled outlet.

FIG. 20A schematically depicts a first example of a rotating head nozzle having an angled outlet. The nozzle includes an elbow or bend that redirects the flow such that the fluidjet emerging from the outlet is substantially orthogonal to the axis of rotation of the rotating head nozzle.

Figure 20B:
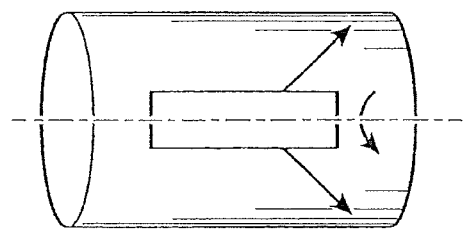
FIG. 20B schematically depicts a second example of a rotating head nozzle having two obliquely angled outlets.

FIG. 20B schematically depicts a second example of a rotating head nozzle having two angled outlets. The angled outlets cause the flow to bifurcate into two substantially equal and obliquely angled jets. Although the jets are shown in the figure to be approximately 45 degrees to the axis of rotation, the angle can of course be varied for different applications.

Figure 20C:
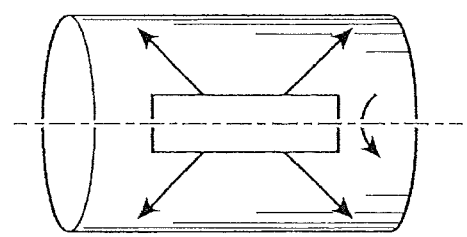
FIG. 20C schematically depicts a third example of a rotating head nozzle having four angled outlets.

FIG. 20C schematically depicts a third example of a rotating head nozzle having four angled outlets. In the embodiment depicted in this figures, there are two forwardly angled outlets and two rearwardly angled outlets. In the depicted embodiment, although the four outlets are shown to be disposed at approximately 45 degrees to the axis of rotation, the angles of each of the outlets may be varied.

Figure 20D:
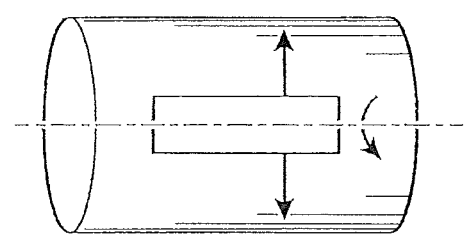
FIG. 20D schematically depicts a fourth example of a rotating head nozzle having two orthogonal outlets.

FIG. 20D schematically depicts a fourth example of a rotating head nozzle having two orthogonal outlets that are angled at approximately 90 degrees relative to the axis of rotation.

Figure 21:
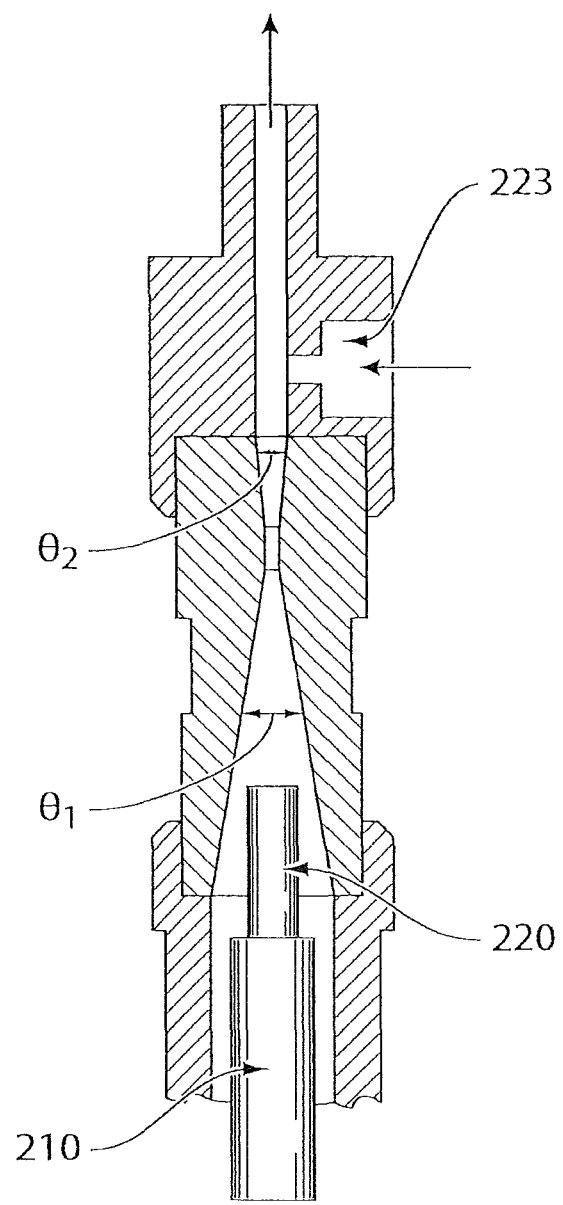
FIG. 21 is a schematic depiction of a Laval (converging-diverging) nozzle for generating a particle entrained continuous or pulsed gasjet.

FIG. 21 illustrates an exemplary nozzle (or "fluidjet nozzle") that may be used in this novel prepping and coating system. The nozzle serves to entrain particles into the fluid stream and then to direct the particles at the surface for prepping and then for coating. In general, the nozzle includes (i) a fluid inlet connected to a pump (designated by numeral 26 in FIG. 5) for receiving the fluid from the pump; and (ii) a particle inlet connected to the particle delivery subsystem for receiving the particles to be used for prepping. The nozzle entrains the particles into a fluid stream to produce a particle-entrained fluid stream. The nozzle includes (iii) an outlet for directing the particle-entrained fluid stream at the surface to thereby prep the surface to a prescribed surface roughness.

The nozzle may be an ultrasonic nozzle having a piezoelectric or magnetostrictive transducer connected to a microtip for modulating the fluidjet. The nozzle is designed for ultrasonically modulating a waterjet or other liquid jet to produce a high-pressure forced pulsed waterjet. Pressurized water is brought into the nozzle at the water inlet. Coating particles are injected or suctioned into the nozzle via two angled particle inlets (suction ports). In this particular configuration, the particle inlets (suction ports) are part of a cylindrical body threaded onto the nozzle as an outer annular component surrounding the portion of the nozzle housing the microtip. A central passageway in the cylindrical body defines a mixing chamber. The mixing chamber is placed downstream of the angled particle inlets (suction ports) to mix the particles with the modulated/pulsed waterjet to create a pulsed slurry (i.e., the slurry consists of water and the particles). The nozzle also includes an outlet (or outlet tube) extending downstream from the mixing chamber inside the cylindrical body.

FIG. 21 is a schematic depiction of a Laval (converging-diverging) nozzle for generating a particle-entrained continuous or pulsed gas jet, e.g. a pulsed airjet. A Laval nozzle has a converging section followed by a diverging section as shown in the figure. The Laval nozzle can be used advantageously in an airjet system. See, e.g. "Machining of Solid Materials by High Speed Airjet" by R. Kobayashi, Y. Fukunishi & T. Ishikawa published in *Jet Cutting Technology* (BHR Group; D Saunders, Editor) as Proceedings of the 10$^{th}$ International Symposium (Amsterdam, The Netherlands, 31 Oct.-2 Nov. 1990). The Laval nozzle may have either conical or bell-shaped sections. As further depicted in FIG. 21, for a pulsed gasjet such as a pulsed airjet, the nozzle includes an ultrasonically oscillating magnetostrictive or piezoelectric transducer 210 with a microtip 220 for generating a pulsed airjet or other pulsed gas jet. The ultrasonic transducer 210 and the microtip 220 are located inside the nozzle 200 as shown, with the microtip extending into the converging section of the Laval nozzle. A particle inlet 223 is preferably disposed downstream of the microtip 220. For ultrasonically pulsed nozzles, the coating particles are preferably drawn into the nozzle downstream of the microtip connected to the forward end of the ultrasonic transducer to thereby avoid wearing the microtip. Flow characteristics can be modulated by varying key parameters such as the diameter of the air inlet, diameter of the throat ($d_N$), diameter of the exit orifice ($d_e$), and the angles $\theta_1$ and $\theta_2$. In one embodiment, angles $\theta_1$ and $\theta_2$ are equal. In another embodiment, $\theta_1$ is greater than $\theta_2$. In another embodiment, $\theta_1$ is less than $\theta_2$. These are all important parameters to generate a highly coherent and high-speed particle-entrained continuous or pulsed airjet. Since the density of air is quite low, the operating pressures will be of the order of 1,000 psi (6.9 MPa).

Figure 22:
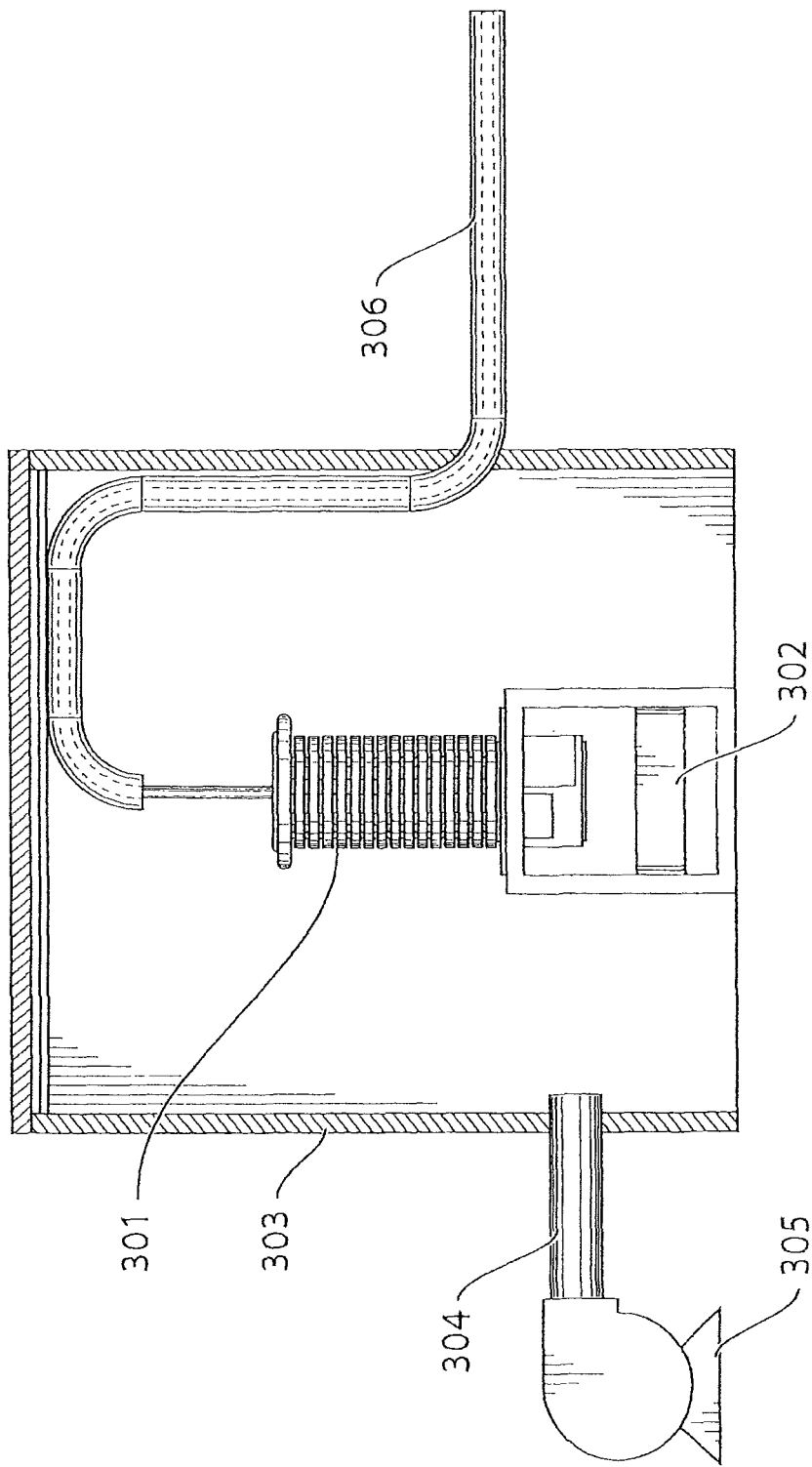
FIG. 22 is a depiction of the high-voltage DC power supply enclosed in a Faraday cage.

FIG. 22 shows a schematic depiction of the high-voltage DC power supply required for generating the electric field between the ultrasonic nozzle body and the work piece. The high-voltage generator 301 with the control panel 302 is enclosed in an electrically shielded enclosure i.e. a Faraday cage 303. The cage is cooled by proper ducting 304 to an air compressor 305. The insulated high-voltage cable 306 enclosed in a plastic tubing (e.g. the cable may be connected either to the nozzle or to the workpiece in the cell as shown for example in FIG. 1). The Faraday cage, which is made of metallic shields using sheets or meshes, is widely used to protect electronic instruments from damage caused by external electric field and electromagnetic pulse (EMP). In addition, the Faraday cage ensures the safety of the operators working in the vicinity of the coating system. The external walls (including the roof and bottom) of the cell are covered with metal sheets and with metallic mesh for windows and doors. The external walls are fully grounded, so that any possible electrical discharge occurring in the cells will be confined in the cell and cause no harm to the people and no damage to electronic instruments outside the cell. In addition to keeping a large distance between the wall and the high-voltage power supply/coating cell, the inner walls of the cell are made of electrical insulation material to prevent possible electrical breakdown of air in the cage.

This novel integrated system enables stripping, prepping and coating of parts to be refurbished (or, alternatively, prepping and coating of new parts that do not require stripping off of old or worn coatings). Stripping and prepping the surface can be achieved with a pulsed or continuous fluidjet, with or without the abrasives (which may be coating particles). Coating may be accomplished using the novel electro-coating technique. In that instance, coating can be accomplished by a flick of the electrical switch that turns on the electric field to charge the coating particles. In other words, all the operations can be carried out in a single booth or cell such as the one shown by way of example in FIGS. 1-3.

From the foregoing, it is apparent that the fluid jet can be a continuous gas jet (e.g. airjet), a pulsed gas jet (e.g. pulsed airjet), a continuous liquid jet (e.g. continuous waterjet) or a pulsed liquid jet (e.g. pulsed waterjet). Regardless of the nature of the fluid jet, the same type of coating particles that are to be subsequently used for coating the surface are first used as the blasting particles (abrasive particles) for prepping the surface. The coating particles are then entrained into the fluid stream, be it liquid or gas, continuous or pulsed, and electrically charged before being accelerated to supersonic speeds for impingement upon the surface to be coated. The particles may be electrically charged prior to entrainment into the fluid jet or after entrainment into the fluid jet.

In the embodiment described above, the part is charged to a polarity opposite to that of the particles. However, in other embodiments, it is possible to charge only the particles. The excess electrons carried by the charged particles will be drawn to the part because the part is grounded, and therefore the part provides a conduit to ground for the electrons to flow.

In some embodiments, the integrated stripping (if required), prepping and coating system includes a computer, microprocessor or microcontroller to control stripping (if required), prepping and coating operations for the system. For example, the microprocessor may initiate stripping and prepping by disabling (switching off) the ionizing electric field, if it is active from a previous cycle of stripping and prepping and coating, and switching the valve(s) of the particle delivery subsystem to the desired particle hopper (where two different mesh sizes of coating particles are used, if required, one for stripping and prepping, the other for coating). The microprocessor may also, for example, control the operation of the pump and/or ultrasonic generator (where a pulsed fluid jet is used). The microprocessor may also, for example, control the valve for regulating the delivery/entrainment of particles into the nozzle.

Determining when stripping, if required, and prepping of the part is complete may be done by the microprocessor (or alternatively by a technician or other user). The microprocessor may determine that stripping and prepping of the part is complete based on a pre-programmed or predetermined surface finish, which is determined by the magnitude of values Ra and/or Rz.

The microprocessor may then automatically switch the system from stripping/prepping mode to coating mode although, in other embodiments, this may be done manually by a technician or other user. For coating, the electric field is activated by switching on the DC power supply. This may be done by the microprocessor. For example, the microprocessor may transmit an activation signal to the switch that turns on the DC power. When coating is complete, the microprocessor sends a deactivation signal to the switch to turn off the electric field. The voltage output of the DC power supply may also be controlled by the microprocessor to provide a variable strength of electric field.

For coating mode, the microprocessor may also be used to switch the particle hopper to entrain a different mesh size of the same type of coating particles. The microprocessor may control the valve to regulate the flow of coating particles into the nozzle. The microprocessor may also control the pump and/or the ultrasonic generator as it may, in certain cases, be desirable to operate the nozzle at a different pressure and/or ultrasonic frequency for stripping, prepping and coating, although the same pressure and ultrasonic frequency may be employed in most cases for stripping, prepping and coating.

The microcontroller (along with the rest of the stripping/prepping/coating system) may be integrated within a fully automated or robotic part refurbishment system capable of receiving a part, stripping the part, prepping the part and then coating the part. In other words, the novel prepping and coating system may be integrated within a comprehensive part refurbishment system that strips an existing coating, preps the surface to a desired surface roughness, and applies a new coating. The coating removal stage may be performed using pulsed or continuous fluid jets, and with or without an abrasive entrained into the fluid jet. The microprocessor can control the fluid jet and any (optional) abrasive entrainment so that the nozzle operates at different sets of operating parameters for stripping, prepping and coating. For example, a first set of operating parameters may be used for coating removal, a second set of operating parameters may be used for surface prepping, and a third set of operating parameters may be used for coating. One single integrated system can thus perform all refurbishment operations needed to completely refurbish a part.

Further aspects of this invention are now described below.

As disclosed in U.S. Pat. No. 7,594,614 (Vijay et al.), almost all parts used in industries require some type of coating to protect against corrosion, wear, etc. An example is the landing gear of an airplane. Generally, the coating of a part is a multi-step process consisting of cleaning it, removing any existing coating, and prepping the surface to required specifications before applying the new coating. Note that cleaning means to removing any dirt, grime or dust without removing the coating. Stripping means removing the coating. Prepping means roughening the surface of the part to a desired Ra and/or Rz value although the surface profile may be characterized using other parameters such as Rmax (largest peak to valley measurement), Rt (maximum peak to lowest valley measurement and Pc (peak count). Coating means applying a particle or powder coating to the part (the main difference between a conventional liquid paint and a powder coating being that the powder coating does not require a solvent to keep the binder and filler parts in a liquid suspension form). Traditionally, prepping the surface is conducted by blasting with abrasive media, which are generally sand particles or other media, which are foreign particles, which may cause damage to the atomic structure of the substrate. As disclosed by Vijay (in U.S. Pat. No. 8,389,066), this problem can be overcome by using the same particles which are used for coating the part. For example, if titanium particles are used for coating the part, then the same particles can be used for prepping the surface. It is also possible to prep the surface with high-frequency pulsed waterjet (US Patent Application Publication 2011/0250361 which is hereby incorporated by reference) or a cavitating waterjet (U.S. Pat. No. 8,297,540 which is hereby incorporated by reference) with or without abrasives in the jet. Furthermore, the operations are normally conducted at different locations. The part may be stripped at one plant, sent to another for prepping and yet another factory for re-coating. This entails increase in the turnaround time (TAT) with considerable amount of money spent on shipping, warehousing and other costs. The purpose of the invention disclosed in this application is to carry out all these processes at a single location resulting in considerable savings in time and cost. Yet another advantage is that the entire technique is environmentally friendly since no waste products are generated.

FIG. 1 shows a typical booth, station or a cell in which the sequence of stripping, prepping and coating (or re-coating) operations can be carried out automatically. Optionally, an initial step of cleaning the part may be performed before stripping, prepping and re-coating. In the embodiments of the invention, high-speed fluid jets, either continuous or pulsed, are used to clean, prep, strip and coat the part (item #4). The coating process, as illustrated in FIGS. 4, 5 and 6, is an improvement on the electrostatic coating technique, however modified to work with high-speed fluid jets, either continuous or pulsed. In other words, the illustrated embodiments of the system use a direct current (DC) power supply rated to operate at voltages of up to 500 kV, to charge the part or the coating particles, depending on the type of coating particles and the part. When the switch connecting the DC power supply is turned off, the high-speed fluid jet, either continuous or pulsed, acts to clean, strip and prep the part to be subsequently coated. As disclosed in U.S. Pat. No. 8,389,066, if the part to be coated is fabricated from hard metals, such as hard steels, the fluidjet will entrain the same type of coating particles to be used as abrasive particles for prepping the surface. For parts fabricated with soft metals, such as aluminum alloys, the fluidjets will not require abrasive particles for prepping the part. Although not shown in FIG. 1, the automated system includes, as was shown in FIG. 4, an abrasive particle hopper system. As disclosed in U.S. Pat. No. 8,389,066, as the particles used in the prepping stage are quite large in size (vary anywhere from 105 microns to 595 microns) compared to the sizes used in the coating operation (generally of the order of 50 microns in the HVOF coating technique, 5 to 50 microns in cold spray system and from 0.005 to 0.1 microns in nanoparticle systems), and as the sizes of the particles decrease after each stripping or prepping operation, the particles can be recycled and purified (filtered) for reuse in coating the part. As shown in FIGS. 1-3, the booth includes a fully sound-insulated space to reduce the noise levels (item #1, FIG. 1 & item #3, FIG. 3), a turntable (item#3, FIG. 1, item #4, FIG. 2), apart, component or workpiece to be stripped, prepped and re-coated (item #4, FIG. 1), HMI (human-machine-interaction) monitor to enable an operator to interact with the robot (Item #2, FIG. 1, Item #1, FIG. 2), a robot (item #2, FIG. 2) for articulating the nozzle which generates high-speed fluidjet with or without abrasive particles, a robot control unit (item #6, FIG. 2) to program the robot and an electrical box with an ultrasonic generator which is used to produce a pulsed fluidjet (when a pulsed jet is desired) and other electrical components, a high-pressure pump (not shown in FIGS. 1, 2 & 3) for producing liquid jets and a compressor (not shown in FIGS. 1, 2 & 3) for generating high-speed gas jets, an exhaust system (item #5, FIGS. 1 & 2) with a strainer to remove some particles which escape with the fluidjets. The sequence of operations entails mounting the part on the turntable and closing the doors of the cell, with the DC power supply turned off generating the fluidjet (which is either liquid or gas and which is either continuous or pulsed) as required by the job, for cleaning, stripping and prepping the part, using coating particles, if desired, as abrasives for stripping or prepping and when the part is prepped to the required specifications (as specified in the publication ASME (American Society of Mechanical Engineers) standard ASME B46.1-2002 (Surface Texture (Surface Roughness, Waviness, and Lay); highly variable depending upon the type of coating technique, coating material and the substrate material), turning on the DC power supply for coating the part. In other words, in a single booth, cleaning, stripping, prepping and subsequently coating the part can be performed, resulting in substantial savings in time and cost. This is a significant improvement over the prior-art technologies available for stripping, prepping and re-coating parts. Furthermore, by controlling the operating parameters such as pressure, flow, frequency (if pulsed jets are used), standoff distance and voltage, it is possible to use any sizes of coating particles and to prep the surface to any required specifications. As shown by way of example in FIGS. 1-3, the size of the cell is quite small compared to, for example, a typical HVOF system.

Accordingly, FIGS. 1, 2 & 3 depict a single turnkey system for (1) stripping a coating from a part (e.g. using forced pulsed waterjet (FPWJ) or a coating particle-entrained slurry jet or abrasive forced pulsed waterjet (AFPWJ), (2) prepping the surface (with FPWJ or AFPWJ) and, (3) subsequently coating the part with the coating technique described in this specification. Although the systems and methods are believed to work best with FPWJ or AFPWJ, the technology may be used with a continuous jet or a pulsed jet (natural or forced-pulsed jet) and with any type of fluidjet (liquid or gas).

The novel system and method is believed to be a significant improvement over known techniques, specifically overcoming the following deficiencies with prior-art technologies:

(1) Chrome Plating: this technique will not be allowed for coating parts in aerospace industry because the coating process is carcinogenic.

(2) Plasma Spray: Although it is used extensively, this technique has some drawbacks—high temperatures, low bond strength and high porosity. This technique is used for TBC coatings (i.e. ceramic coatings).

(3) Cold Spray: This technique involves propelling the particles at high velocities for impacting the surface to be coated. This is a purely mechanical bonding by impregnation. This is used mainly for coating soft substrates such as aluminum and titanium alloys and is not suitable for high-strength steels.

(4) HVOF (High-Velocity-Oxy-Fuel): Particles are injected basically in a flamejet. The particles melt and form droplets, forming the coating after impacting the surface. The technique will replace chrome plating in all industries. The main drawback is high-temperatures and low deposition efficiency along with very large size.

The novel system and method disclosed herein provides at least two broad inventive concepts: (1) a single integrated system (e.g. single cell, booth, station, etc.) for stripping, prepping and re-coating a part; and (2) coating the part using a novel coating technique that is believed to be significantly better than the cold spray technique and may achieve the same coating characteristics as HVOF without the above-mentioned drawbacks.

Some of the factors used in testing the new technique were:

1. Bond Strength (Adhesion to the substrate, a): Good bond strength is considered to be 69-MN/m2.

The variables that can be controlled in the method are:

Speed of Particles (Vp):

Vp is related to the speed of the fluidjet (Vj). If water is used as the medium, since pump pressures up to 100-kpsi (690-MPa) can be used, Vj can be varied quite readily (Note: Vp will always be <Vj, due to frictional effects in the mixing chamber; therefore it is quite important to design a highly effective mixing chamber). The magnitude of Vp will also depend on the type of particle used for coating (say WC as opposed to Cr) because of the variation in density, ρc (function of size of particles). The jet carrying the particles could be solid core liquid jet, pulsed or continuous, or could be droplet jets. As shown in the design of the nozzles, by proper design of the mixing chamber into which particles are injected, it is possible generate both solid core liquid or droplet jets.

Voltage of the Charged Particles (Vc):

This can also be varied from 5 to Vcmax (e.g. 5-500 kV). However, from the standpoint of safety, the magnitude of Vc must be as low as possible, which can be accomplished by increasing Vj. Also, since the bonding of the particles to the substrate is both electronic and mechanical, the bond strength would be significantly better than cold spray.

Standoff Distance (Sd):

This is another important variable to control the bond strength, thickness and area of coating and deposition efficiency. For any given combination of the type of coating particles and the part to be coated, it is possible to achieve desired uniform thickness of the coating, area of coating and the bond strength by a proper set of Vj, Vc and Sd and frequency (f), if pulsed fluidjets are employed.

2. Surface Profile (Prepping): Bond strength is known to be a function of surface profile. Since we are using particles for coating, the same particles can be used for prepping (AFPWJ), if it is not possible to prep with the fluidjet only, pulsed or continuous. Although the values of Ra (rms value of the surface roughness) and Rz (peak to valley of the surface roughness; ASME B46.1-2002), are used to measure the quality of the prepped surface, Rz appears to be the determining factor for strength of the bond. Therefore, α, the bond strength of the coating is a function of Vj which propels the particles at a speed of Vp, Vc, Sd, Rz, and ρc. The coating thickness on the other hand, depends on the number of passes of the fluidjet nozzle over the surface to be quoted. For example, in the HVOF technique the magnitude of the thickness of coating per pass of the flame jet over the surface is of the order of 0.0005-in. In the novel coating technique proposed in this application, it is possible to achieve twice or three times the coating thickness per pass as the technique has, in addition to the fluidjet properties, the voltage.

Nozzle embodiments for coating the part are shown by way of example in FIGS. 6 to 9, although many other nozzle designs may be used. Furthermore, in the embodiments shown in these figures, a forced pulsed waterjet (U.S. Pat. No. 7,594,641, which is hereby incorporated by reference) is used as a medium for transporting the coating particles, although any other suitable medium, such as air, can also be used (U.S. Pat. No. 8,389,066, which is hereby incorporated by reference). Also, in the embodiments shown, coating particles entering the mixing chamber are shown to be neutral. However, it is also possible to feed charged particles, which are charged in a hopper through the mixing chamber (see the FIGS. 4 and 15). Various nozzle embodiments are used depending upon the type of coating particles, the sizes of the particles (nanoparticles to micro particles) and the type of substrate, from soft (for example, aluminum alloys) to hard metals (such as hard steels).

To summarize, the present invention provides two broad inventive aspects: (1) a single integrated stripping, prepping and coating system and its related method and (2) an electrostatic (electric field) coating technique that harnesses the benefits of high-speed continuous or pulsed fluidjets. The novel high-speed fluidjet electrostatic (electric field) coating technique may be used in the integrated stripping, prepping and coating system and method or it may be used alone (i.e. outside the context of the integrated booth). Likewise, in another embodiment, the single integrated stripping, prepping and coating system may use a cold-spray coating technique instead of the electrostatic technique. The novel integrated coating system provides a one-stop apparatus enabling a part to be stripped, prepped and then coated using the same system (e.g. the same booth, cell or station) without having to transport or move the part to another location or, in some cases, without even having to re-remount or re-jig the part on the turntable or jig within the cell, booth or station. The single integrated system, in the illustrated embodiment, is a single booth or station having preferably a full sound-proofed enclosure inside which the part remains for the entire process of stripping, prepping and coating, a robotically mounted nozzle that performs all stripping, prepping and coating processes, and a single electrical power supply for the station. The cell includes a door to access the turn table or jig for installing and removing the part. The cell may have a window to observe operations from the exterior of the cell. The cell is preferably a water-proof enclosure formed as a Faraday cage and preferably includes an exhaust system for exhausting air or moisture from the cell. The exhaust system or a separate cooling system may be used to cool the Faraday cage, the high-voltage generator or other equipment that generates heat. In other words, the single integrated station performs all stripping, prepping and coating operations using a fluidjet from a robotically controlled nozzle. In a best mode of implementing the technology, the system strips the part using a forced pulsed waterjet and preps the part with the forced pulsed waterjet entraining coating particles as abrasive particles. Coating is then performed by activating the electric field so that the forced pulsed waterjet carries electrically charged coating particles to the part. In this implementation, the pressure, standoff distance, ultrasonic frequency remain the same for all three steps; however, in other implementations, the system may vary these operating parameters to optimize each of the stripping, prepping and coating steps. Although the operating parameters in most embodiments remains constant during a particular step, the system in another embodiment may vary the operating parameters within a particular step, e.g. it may be desirable to augment the electric field as coating progresses.

In one embodiment, the same type (i.e. same chemical composition) of coating particles that are used for coating the surface are also used for prepping the surface. In the prepping stage, uncharged coating particles are entrained into the high-speed continuous or pulsed fluid jet to prep the surface to the prescribed surface roughness. Subsequently, in the coating stage, the same type of coating particles are electrically charged and driven at high speed at the prepped surface of the part to thereby coat the part.

The stripping, prepping and coating methods and processes may be performed in response to user commands (user input) received from an operator, e.g. via the HMI. Alternatively, a series of sequential commands may be programmed by user input. In a further implementation, an automated system may automatically detect when stripping of the part is complete using a machine vision subsystem that performs optical inspection of the part and then automatically switches to prepping mode. Detecting that stripping (coating removal) is done may be based on sensing the color of the part and/or the surface roughness by measuring Ra and/or Rz and comparing to a predetermined range of acceptable Ra/Rz values. Likewise, the automated system may automatically detect when prepping is complete. For detecting that prepping is done, the system uses the machine vision subsystem. by measuring Ra/Rz and comparing to a predetermined range of target Ra/Rz values. If the measured Ra/Rz is within the predetermined range, then the system considers prepping complete and then automatically switches to coating mode. The automated system may automatically detect when coating is complete using the machine vision subsystem. The system may then notify the user that the process is has been completed. The machine vision subsystem may include a CCD or CMOS sensor (or a group of sensors) coupled to a microscope that provides data to a microprocessor running a machine vision algorithm to evaluate surface texture. Another optical inspection technique involves directing a laser at the surface and capturing the reflected light to evaluate the surface roughness (e.g. U.S. Pat. No. 4,334,780, U.S. Pat. No. 5,585,921, U.S. Pat. No. 5,436,645, and U.S. Pat. No. 7,184,138, which are hereby incorporated by reference). The automated system may have a processor or central processing unit (CPU) coupled to a memory for executing control software that receives user input and/or machine vision (optical inspection) data and sets and/or dynamically adjusts operating parameters (e.g. electric field voltage, fluid pressure, coating particle metering rate, standoff distance, applied magnetic field, applied heat) to provide a user-specified surface finish or roughness, e.g. a specified Ra or Rz value. The memory may store a database of desired Ra or Rz values for different materials, applications and coatings. Therefore, the user may enter the material type, application or type of part (e.g. landing gear) and the desired coating. The automated system may compute the target Ra or Rz value and then perform the stripping, prepping and coating to achieve the target Ra or Rz value.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "involving", "entailing" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Accordingly, the embodiments of the present invention described above are intended to be exemplary only. As will be appreciated by those of ordinary skill in the art, to whom this specification is addressed, many variations, modifications, and refinements can be made to the embodiments by using the inventive concepts presented herein. The scope of the exclusive right sought by the applicant is therefore intended to be defined solely by the appended claims.

The invention claimed is:

1. An integrated liquidjet system capable of stripping, prepping and coating a part, the integrated liquidjet system comprising:
    a cell defining an enclosure;
    a jig for holding the part inside the cell wherein the cell includes a Faraday cage;
    an ultrasonic nozzle having an ultrasonic transducer for generating a pulsed liquidjet;
    a coating particle source for supplying coating particles to the ultrasonic nozzle;
    a pressurized liquid source for supplying the nozzle with a pressurized liquid to enable the ultrasonic nozzle to generate the pulsed liquidjet to sequentially strip, prep and coat the part;
    a high-voltage electrode and a ground electrode inside the nozzle for charging the coating particles; and
    a human-machine interface external to the cell for receiving user commands and for controlling the pulsed liquidjet exiting from the ultrasonic nozzle in response to the user commands.

2. The system as claimed in claim 1 wherein the pulsed liquidj et is a forced pulsed waterjet.

3. The system as claimed in claim 1 wherein the jig comprises a turntable for rotating the part at an angular velocity controlled by the human-machine interface.

4. The system as claimed in claim 1 further comprising an exhaust system for exhausting air from the cell.

5. The system as claimed in claim 1 wherein the human-machine interface provides a first set of operating parameters for coating removal, a second set of operating parameters for surface prepping, and a third set of operating parameters for coating.

6. The system as claimed in claim 1 further comprising a machine vision subsystem that performs optical inspection of the part to determine when stripping is complete and to automatically switch to prepping.

7. An integrated liquidjet system capable of prepping and coating a part, the integrated liquidjet system comprising:
    a cell defining an enclosure;
    a jig for holding the part inside the cell wherein the cell includes a Faraday cage;
    an ultrasonic nozzle having an ultrasonic transducer for generating a pulsed liquidjet;
    a coating particle source for supplying coating particles to the ultrasonic nozzle;
    a pressurized liquid source for supplying the ultrasonic nozzle with a pressurized liquid to enable the ultrasonic nozzle to generate the pulsed liquidjet to sequentially prep and coat the part;
    a high-voltage electrode and a ground electrode inside the ultrasonic nozzle for charging the coating particles; and
    a human-machine interface external to the cell for receiving user commands and for controlling the pulsed liquidjet exiting from the ultrasonic nozzle in response to the user commands.

8. The system as claimed in claim 7 wherein the pulsed liquidjet is a forced pulsed waterjet.

9. The system as claimed in claim 7 wherein the jig comprises a turntable for rotating the part at an angular velocity controlled by the human-machine interface.

10. The system as claimed in claim 7 further comprising an exhaust system for exhausting air from the cell.

11. The system as claimed in claim 7 wherein the human-machine interface provides a first set of operating parameters for coating removal, a second set of operating parameters for surface prepping, and a third set of operating parameters for coating.

12. The system as claimed in claim 7 further comprising a machine vision subsystem that performs optical inspection of the part to determine when stripping is complete and to automatically switch to prepping.

* * * * *

UNITED STATES PATENT AND TRADEMARK OFFICE
CERTIFICATE OF CORRECTION

PATENT NO. : 9,821,337 B2  
APPLICATION NO. : 15/297265  
DATED : November 21, 2017  
INVENTOR(S) : Vijay et al.

Page 1 of 1

It is certified that error appears in the above-identified patent and that said Letters Patent is hereby corrected as shown below:

In the Specification

Column 10, Line 14, please delete "pertained" and insert --performed--.

Column 18, Line 8, please delete "insetting" and insert --inserting--.

Column 24, Line 35, please delete "apart" and insert --a part--.

In the Claims

Column 29, Line 31, please delete "liquidj et" and insert --liquidjet--.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*